United States Patent
Atkins

(10) Patent No.: US 9,300,938 B2
(45) Date of Patent: Mar. 29, 2016

(54) SYSTEMS, APPARATUS AND METHODS FOR MAPPING BETWEEN VIDEO RANGES OF IMAGE DATA AND DISPLAY

(75) Inventor: Robin Atkins, Campbell, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 375 days.

(21) Appl. No.: 13/808,999

(22) PCT Filed: Jul. 19, 2011

(86) PCT No.: PCT/US2011/044558
§ 371 (c)(1),
(2), (4) Date: Jan. 8, 2013

(87) PCT Pub. No.: WO2012/012446
PCT Pub. Date: Jan. 26, 2012

(65) Prior Publication Data
US 2013/0114000 A1    May 9, 2013

Related U.S. Application Data

(60) Provisional application No. 61/366,895, filed on Jul. 22, 2010.

(51) Int. Cl.
*H04N 9/77* (2006.01)
*H04N 5/20* (2006.01)
*H04N 9/67* (2006.01)
*G09G 5/00* (2006.01)

(52) U.S. Cl.
CPC ............ *H04N 9/77* (2013.01); *G09G 5/005* (2013.01); *H04N 5/20* (2013.01); *H04N 9/67* (2013.01); *G09G 2320/0626* (2013.01); *G09G 2320/0666* (2013.01); *G09G 2352/00* (2013.01)

(58) Field of Classification Search
None
See application file for complete search history.

(56) References Cited

U.S. PATENT DOCUMENTS

| | | | |
|---|---|---|---|
| 6,016,144 | A | 1/2000 | Blonstein |
| 6,137,539 | A | 10/2000 | Lownes |
| 6,683,989 | B1 | 1/2004 | Fujiwara |
| 6,844,886 | B1 | 1/2005 | Yanagawa |

(Continued)

FOREIGN PATENT DOCUMENTS

| | | |
|---|---|---|
| KR | 10-2008-0095671 | 10/2008 |
| WO | 2011/106247 | 9/2011 |

OTHER PUBLICATIONS

Chengyuan, P. "Digital Television Applications" 2002, Telecommunications Software and Multimedia Laboratory, Department of Computer Science and Engineering, Helsinki University of Technology.

(Continued)

*Primary Examiner* — Mark Zimmerman
*Assistant Examiner* — Vu Nguyen
(74) *Attorney, Agent, or Firm* — Larry E. Henneman, Jr.; Henneman & Associates, PLC

(57) ABSTRACT

Systems, apparatus and methods are provided to map a video range of image data to the video range of a display. Embodiments apply a weighted combination of values in input image data streams to generate image data having a range which matches the display capabilities. The weighted combination may be determined based on relative capabilities of the display and input image data. The video range of the image data and display may be a range of colors (gamut) and/or luminance (dynamic range).

20 Claims, 13 Drawing Sheets

(56) References Cited

U.S. PATENT DOCUMENTS

| | | |
|---|---|---|
| 6,859,536 B1 | 2/2005 | Kori |
| 7,508,452 B2 | 3/2009 | Mori |
| 7,525,540 B2 | 4/2009 | Song |
| 2005/0104900 A1 | 5/2005 | Toyama |
| 2006/0001777 A1 | 1/2006 | Araki |
| 2006/0140268 A1 | 6/2006 | Ha |
| 2006/0259615 A1 | 11/2006 | Beniya |
| 2006/0285744 A1 | 12/2006 | Wu |
| 2008/0007616 A1 | 1/2008 | Baladhandayuthapani |
| 2008/0012805 A1* | 1/2008 | Duncan et al. .................. 345/84 |
| 2008/0137976 A1* | 6/2008 | Ward ............................ 382/254 |
| 2008/0263621 A1 | 10/2008 | Austerlitz |
| 2008/0266315 A1 | 10/2008 | Im |
| 2009/0051820 A1 | 2/2009 | Oikawa |
| 2009/0091656 A1 | 4/2009 | Kitaru |
| 2009/0091665 A1 | 4/2009 | Kang |
| 2009/0274219 A1 | 11/2009 | Greene |
| 2011/0157212 A1* | 6/2011 | Zhang et al. .................. 345/590 |
| 2011/0316973 A1 | 12/2011 | Miller |
| 2012/0315011 A1 | 12/2012 | Messmer |
| 2012/0321273 A1 | 12/2012 | Messmer |

OTHER PUBLICATIONS

D'Hautecourt, Alain, "Reconciling EDID Requirements in a Converged World" SID Conference Record of the International Display Research Conference, p. 115-118, 2005, Proc. of the Twenty-fifth International Display Research Conference, EuroDisplay 2005.

* cited by examiner

SYSTEMS, APPARATUS AND METHODS FOR MAPPING BETWEEN VIDEO RANGES OF IMAGE DATA AND DISPLAY

CROSS REFERENCE TO RELATED APPLICATIONS

This application claims priority to U.S. Provisional Patent Application No. 61/366,895 filed 22 Jul. 2010, hereby incorporated by reference in its entirety.

TECHNICAL FIELD

This invention relates to the processing and display of images. Some embodiments provide systems, apparatus and methods for processing image data for a display having a range that is different from a corresponding range of the image data.

BACKGROUND

Displays include televisions, computer monitors, home cinema displays, digital cinema displays, dedicated displays on devices such as tablet computers, cellular telephones, digital cameras, copiers, industrial controls, specialized displays such as displays for medical imaging, virtual reality, vehicle simulation and the like. Colour displays may be used to display colour images specified in image data.

Displays may incorporate any of a wide variety of underlying display technologies. For example, displays may comprise: cathode ray tube (CRT) displays; backlit liquid crystal displays (LCDs); plasma displays; light-emitting diode (LED) displays; organic LED displays (OLED displays); laser projectors; digital mirror device (DMD) displays; and electroluminescent displays. Within any of these general technologies a wide variety of different constructions and compositions for light-emitting and/or filtering elements are possible. As a result, different displays may have capabilities that differ significantly in areas such as, for example, the range of different colours (i.e. gamut) that can be displayed, the range in luminance values that can be displayed (i.e. the dynamic range of the display), and the like. The range of the display's capabilities in one area may be defined as a particular video range of the display.

Image data (including video data and still image data) can have any of a wide variety of different formats. Some example image data formats are: RGB, YLU, GIF, TIFF, JPEG/JIF, PNG, BMP, PDF, RAW, FITS, MPEG, MP4, high dynamic range (HDR) formats such as BEF, HDRi, JPEG XR, JPEG HDR, RGBE, ScRGB and many others. Image data formats can have capabilities that differ significantly in areas such as, for example, the range of different colours (i.e. gamut) that can be specified, the range of luminance levels (i.e. dynamic range) that can be specified, the number of discrete colours within the gamut that can be specified, the number of discrete luminance levels that can be specified, and the like. Some image data formats have multiple versions having different capabilities. The range of the image data format's capabilities in one area (e.g. chrominance or luminance) may be defined as a particular video range of the image data format. The range of values (e.g. chrominance or luminance values) specified by specific image data may be defined as the particular video range of the image data.

Colours may be specified in many different colour spaces. Some examples include RGB, HSV, LUV, YCbCr, YIQ, YCbCr, xvYCC, HSL, XYZ, CMYK, CIE LAB, IPT, and others. Different image data formats may specify colours in different colour spaces.

It may be desirable to display image data on a display having a video range which may not match the video range of the image data. There is a need for systems, apparatus and methods capable of adjusting image data to provide a good viewing experience in cases where there is a mismatch between the image specification characteristics of image data and image reproduction characteristics of a display.

SUMMARY OF THE INVENTION

The invention has a number of different aspects. These include, without limitation: colour displays; high-dynamic range displays; set-top boxes; image or video data sources such as video players and DVD players; video player software; video display systems for computers; systems and apparatus for processing, decoding and/or transmitting image data (e.g. video data or still image data); methods of altering or processing image data to take into account capabilities of displays on which the image data will be displayed; methods of interpolating between or extrapolating from different image data streams and/or adjusting image data to drive a display which is capable of displaying a range of colours and/or luminance differing from those of the image data streams; methods of preparing image data (such, as for example, video data or still image data) for display on a particular type of display; and the like.

Further aspects of the invention and features of specific embodiments of the invention are described below.

BRIEF DESCRIPTION OF THE DRAWINGS

The accompanying drawings illustrate non-limiting embodiments of the invention.

DESCRIPTION

Figure 1A:
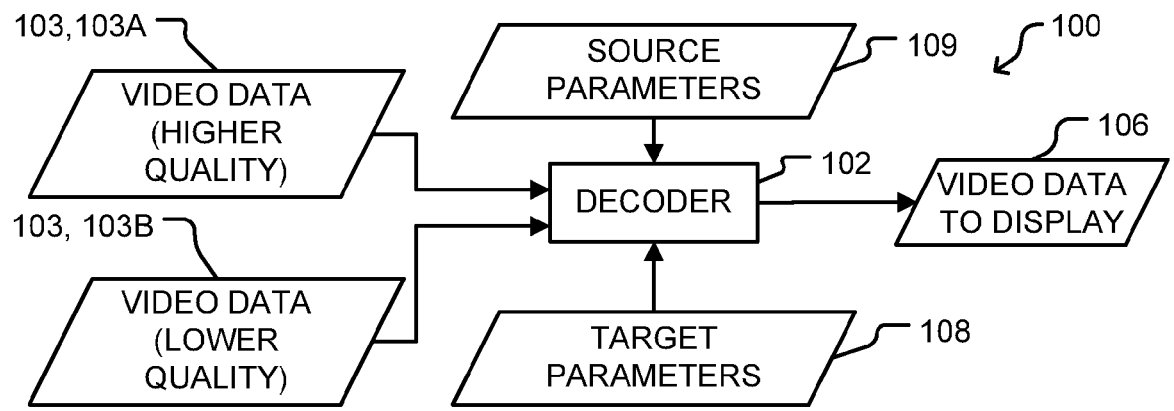
FIGS. 1A and 1B are data flow diagrams illustrating image data being processed by a decoder for output to a display according to example embodiments.

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

Apparatus according to some embodiments of the invention performs mapping to generate image data that is more suitable for display on a display from image data that is less suitable for display on the display. The apparatus may, for example, be incorporated in a display, an image transmission and/or processing device upstream from the display (one example is a set top box), an image source (for example a camera, DVD player, media player, computer or the like). Other example embodiments provide methods which set up and/or perform mapping to generate image data that is more suitable for display on a display from image data that is less suitable for display on the display.

Particular embodiments described herein may be useful for display of image data (e.g. video data or still image data) on a display having a range (e.g. video range) which may not match the corresponding range of the image data. For example, in some cases, the display's range of colours and/or luminance may be too limited to display the full range of colours and/or luminance of the image data. In other cases, the display is capable of displaying a greater range of colours and/or luminance than the range of colours and/or luminance of the image data. In still other cases, the display is capable of a range of colours and/or luminance which falls somewhere between the range of colours and/or luminance of one input image data stream (e.g. a better quality stream) and the range of colours and/or luminance of another input image data stream (e.g. a lower quality stream). In some embodiments, the display may be more capable in respect of one type of range (e.g. gamut) but less capable in respect of another type of range (e.g. dynamic range). Particular embodiments described herein may be applied in respect of only one type of range, or may be applied to a plurality of ranges. Some embodiments treat different ranges differently.

Particular image data formats may represent pixel values within ranges of gamut, luminance, etc. A specific frame of image data represented in a particular image data format may include pixels that push the boundaries of that format, such as, for example, a completely black frame or a frame displaying a test pattern including the full gamut that may be specified by the format. Other frames of image data represented in that format may have pixel values that are within more limited ranges of gamut, luminance, etc. As the ranges may vary between frames, the display capabilities in relation to the image data may be assessed on a frame-by-frame basis or in relation to a sequence (or other series) of frames. Some frames of image data may be adjusted to match the display capabilities, while other frames of image data may not require adjustment.

Adjustments may be determined in real time as frames are processed for display or may be determined in advance. In some embodiments, an adjustment is optimized in advance for a number of frames (for example a scene, an entire movie, or the like).

Methods of processing image data for a particular display may be implemented, for example, by image data handling apparatus such as a decoder. The decoder may map a range of colour and/or luminance and/or other range of image data to an available range of colour and/or luminance and/or other range of a display. The decoder may be provided in a set-top box for the display or in the display itself, or may be implemented in some other apparatus. The decoder may comprise: a processor which executes software instructions stored in a program memory accessible to the processor; configurable hardware; special hardware; combinations thereof and/or the like.

According to particular embodiments, the apparatus may receive or have access to one, two, or more than two input video data streams. Multiple input video data streams may be included in a video signal communicated from a video signal source. Where two or more input video data streams are available to the apparatus, the input video data streams may represent the same images encoded in different video data formats and/or image resolutions (i.e. spatial resolutions) or the same images encoded in the same video format to according to different gamuts, spatial resolutions or the like.

FIG. 1A shows a system 100 in which input video data 103 is processed by decoder 102 to provide video data 106 for output to a target display (not shown). In the case illustrated by FIG. 1A, video data 103 comprises two streams of video data 103A, 103B representing the same images. In the illustrated embodiment, streams of video data 103A, 103B are encoded as higher- and lower-quality video data streams. The higher-quality video data stream may have greater video ranges (e.g. gamut and/or dynamic range) than those of the lower-quality video data stream. In example embodiments, the higher- and lower-quality video data streams may be encoded in Visual Dynamic Range (VDR) and Rec. 709 video data formats, respectively. VDR format is a video data format of a type described, for example, in co-owned PCT Application No. PCT/US2010/022700 for "EXTENDED DYNAMIC RANGE AND EXTENDED DIMENSIONALITY IMAGE SIGNAL CONVERSION AND/OR DELIVERY VIA LEGACY VIDEO INTERFACES" which is hereby incorporated herein by reference. Rec 709 is a video data format specified by ITU-R Recommendation BT.709, which is hereby incorporated herein by reference.

As seen in FIG. 1A, processing of video data 103 by decoder 102 may be guided at least in part by target parameters 108 of the target display and source parameters 109 of video data 103. Target parameters 108 may identify capabilities of the target display, such as, for example, gamut of the display and/or dynamic range of the display. Other target parameters 108 may include compatibility of the target display with particular video data formats, display resolution (number of distinct pixels that can be displayed), and/or the like. Target parameters 108 may be provided, for example, in extended display identification data (EDID) communicated by the target display to decoder 102. Decoder 102 may request target parameters 108 from the target display and may receive a communication of target parameters 108 from the target display.

Source parameters 109 may identify parameters of each stream of video data 103. Source parameters 109 may include, for example, gamut of the video data for a particular frame or sequence of frames of image data, and/or dynamic range of the video data for a particular frame or sequence of frames. Other source parameters 109 may include, for example, gamut that can be specified by the video data format of video data 103, and dynamic range that can be specified by the video data format of video data 103. Other source parameters 109 may include video data format, image resolution (i.e. spatial resolution), and/or the like.

In particular embodiments, at least some of source parameters 109 may be provided to decoder 102 by way of metadata encoded in video data 103. Example methods of encoding and transmitting metadata in video data are described in co-owned applications entitled "SYSTEMS, APPARATUS AND METHODS FOR VIDEO DELIVERY AND CONTROLLING VIDEO DISPLAY USING EMBEDDED METADATA" and "SYSTEMS, APPARATUS AND METHODS FOR VIDEO DELIVERY AND CONTROLLING VIDEO DISPLAY BY OVERWRITING VIDEO DATA" filed on 22 Feb. 2010 which are hereby incorporated herein by reference. Decoder 102 may extract and decode the metadata carried in video data 103 to obtain source parameters 109. In other embodiments, decoder 102 may obtain one or more source parameters 109 according to other methods. For example, decoder 102 may perform one or more of: analyse video data 103; look up source parameters in an accessible database; accept input from a user which indicates the source parameters; receive metadata carried in parallel with video data 103; request the source parameters from a source of video data 103; combinations thereof; or the like; to determine source parameters 109.

Decoder 102 may compare target parameters 108 of the display to corresponding source parameters 109 of video data 103. Based at least in part on an assessment of a relationship of target parameters 108 to source parameters 109, decoder 102 selects a method of handling and/or processing video data 103 for output to the display.

In the FIG. 1A embodiment, decoder 102 may handle the following scenarios:
(1) If target parameters 108 of the display indicate that the display is compatible with the video data format of the lower-quality video data stream, and is at most capable of displaying the lower-quality video data stream, decoder 102 passes video data 103B for output to the display.
(2) If target parameters 108 of the display indicate that the display is compatible with the video data format of the higher-quality video data stream, and is capable of displaying video data having the video ranges of the higher-quality video data stream, decoder 102 retrieves video data stream 103A for output to the display.
(3) If target parameters 108 of the display indicate that the display is compatible with the video data format of the higher-quality video data stream, and is capable of displaying video data having video ranges which are generally between those of the higher- and lower-quality video data streams, decoder 102 processes video data 103 to adapt the video data for output to the display. In some embodiments, processing may be accomplished by interpolating between the video data streams 103A, 103B to provide video data having intermediate video ranges suitable for the display. In other embodiments, processing may be accomplished by mapping the ranges of one of the video data streams to those of the display.
(4) If target parameters 108 of the display indicate that the display is compatible with the video data format of the higher-quality video data stream, and is capable of displaying video data having video ranges which are greater than those of the higher-quality video data stream, decoder 102 processes video data 103 to adapt the video data for output to the display. In some embodiments, processing may be accomplished by extrapolating one or both of the video data streams 103A, 103B to provide video data having expanded video ranges suitable for the display.

Figure 1B:
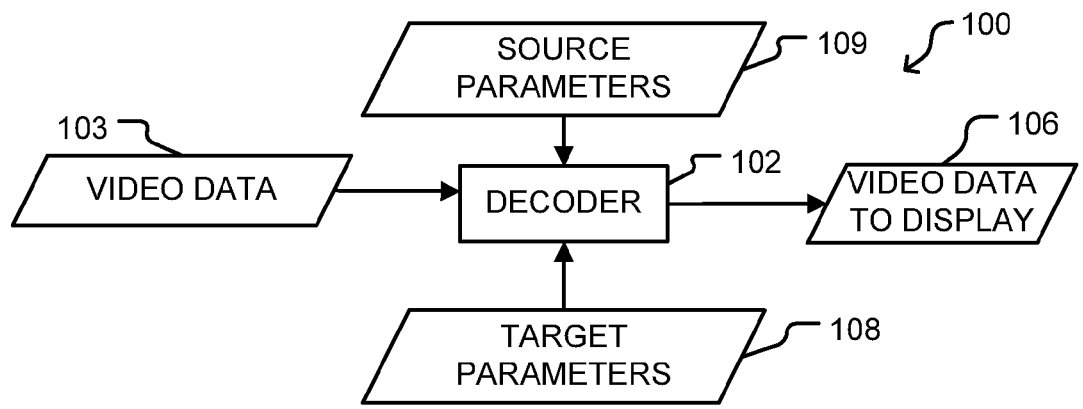

Bandwidth or data storage limitations may in some cases preclude transmission of video data streams in multiple video data formats as shown in FIG. 1A. Video data may be captured in one video data format and in some cases may not be converted into other video data formats and/or other resolutions. FIG. 1B shows system 100 in the case where decoder 102 receives one input stream of video data 103. Video data 103 may be encoded in VDR or Rec. 709 video data format, for example. As with the case shown in FIG. 1A, processing of video data 103 by decoder 102 of the FIG. 1B embodiment may be guided at least in part by target parameters 108 of the display and source parameters 109 of video data 103. Decoder 102 may compare target parameters 108 of the display to corresponding source parameters 109 of video data 103. Based at least in part on an assessment of target parameters 108 in relation to source parameters 109, decoder 102 selects a method of handling and/or processing video data 103 for output to the display.

In the FIG. 1B embodiment, decoder 102 may handle the following scenarios:
(1) If target parameters 108 of the display indicate that the display is compatible with the video data format of the input video data stream, and is capable of displaying video data having the video ranges of the input video data stream, decoder 102 outputs video data 103 to the display.
(2) If target parameters 108 of the display indicate that the display is compatible with the video data format of the input video data stream, and is capable of displaying video data having video ranges which are less than (or in some cases, greater than) those of the input video data stream, decoder 102 processes video data 103 to adapt the video data for output to the display. In some embodiments, processing may be accomplished by mapping the ranges of the input video data stream to those of the display.
(3) If target parameters 108 of the display indicate that the display is not compatible with the video data format of the input video data stream, decoder 102 processes video data 103 to adapt the video data for output to the display. In some embodiments, processing may be accomplished by converting video data 103 into a video data format compatible with the display, and optionally mapping the ranges of video data 103 to those of the display.

In particular embodiments, a decoder may be provided which is capable of handling all or at least a combination of some of the scenarios described above in relation to FIGS. 1A and 1B. For example, in some embodiments, decoder 102 may be capable of handling at least the first three scenarios identified in respect of FIG. 1A. In other embodiments, decoder 102 may be capable of handling at least the scenarios identified in respect of FIG. 1B. In still other embodiments, decoder 102 may be capable of receiving one or two input data streams and handling any of the scenarios described in FIGS. 1A and 1B.

Some example methods that may be implemented by decoder 102 of FIGS. 1A, 1B to process video data 103 for output to a target display are described below with reference to FIGS. 2A to 2G, 3, 4, 5, and 6.

In certain embodiments, the display incorporates a processing unit configured or configurable to process video data for the particular capabilities of the display. It may be desirable that the display's processing unit (rather than decoder 102) handle the mapping of the ranges of the video data streams to those of the display. In such cases, the display may communicate to decoder 102 exaggerated or false target parameters 108 indicating that the display is compatible with a high-quality or advanced video data format and is capable of displaying maximum/minimum values that may be specified by that format. In response to such target parameters, decoder 102 may output the video signal containing video data 103 to the display. The display's processing unit processes video data 103 to map the ranges of the video data stream(s) to those of the display. The methods may include interpolation or extrapolation based on one or more streams of video data.

Figure 2A:
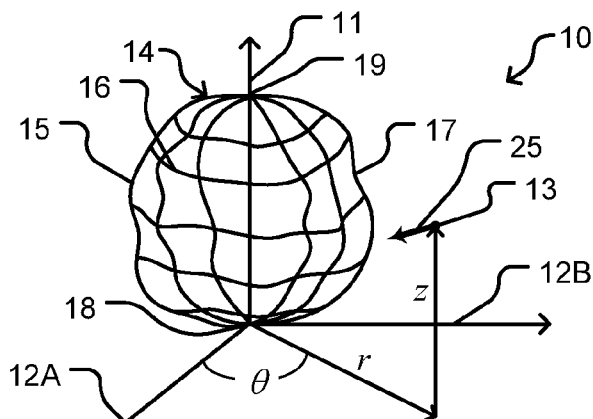
FIG. 2A is a schematic representation of a colour space with longitudinal and latitudinal lines demarcating the boundaries of a gamut. An out-of-gamut point is shown which may be mapped to an in-gamut point.
Figure 3:
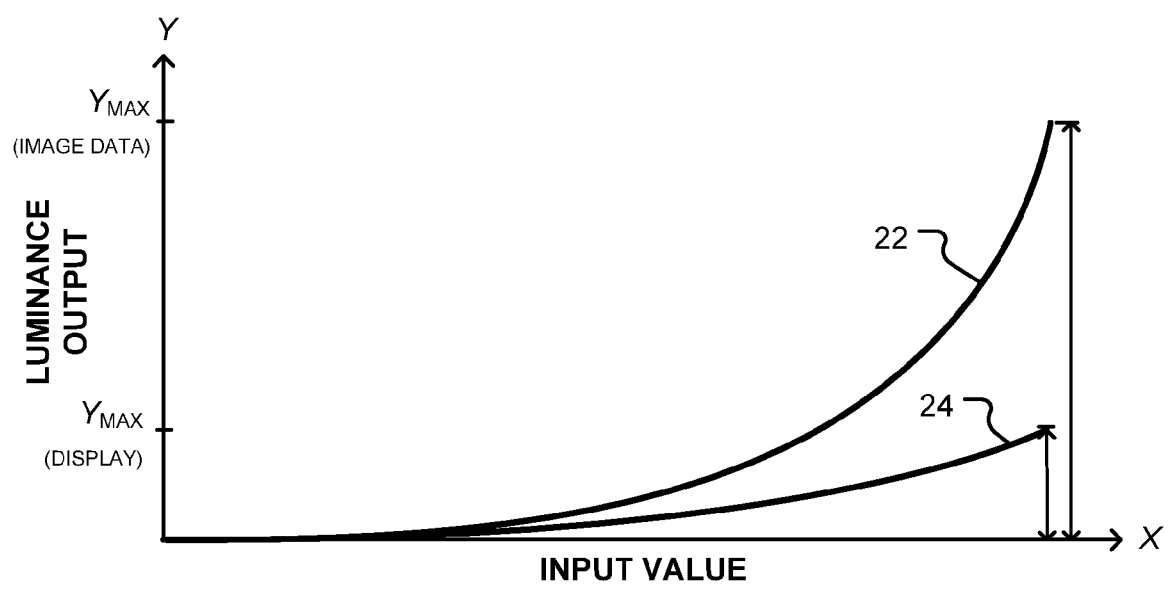
FIG. 3 illustrates output luminance as a function of input values for image data having different dynamic ranges.

FIGS. 2A and 3, respectively, illustrate mapping the colour and luminance ranges of image data (e.g. video data or still image data) to the colour and luminance ranges of a target display. FIG. 2A illustrates an out-of-gamut point specified in image data which may be mapped to a corresponding point on or within the gamut of the display. FIG. 3 illustrates the dynamic range of image data which may be mapped to the dynamic range of a display.

FIG. 2A shows an example colour space 10 defined by a lightness axis 11 and two colour-specifying axes 12A and 12B. Axes 12A and 12B define a plane perpendicular to lightness axis 11. A colour gamut 14 has the form of a three-dimensional area in colour space 10. A boundary 15 of gamut 14 is shown as being demarcated by longitudinal lines 17 and latitudinal lines 16. Gamut 14 has a black point 18 and a white point 19. In this embodiment, black point 18 and white point 19 are both on lightness axis 11. Gamut 14 may comprise a gamut of a particular display. The display is capable of displaying colours represented by points in colour space 10 which are on or within boundary 15, but is not capable of displaying colours represented by points in colour space 10 that are outside of boundary 15.

Points in colour space 10 may be defined by cylindrical coordinates. One coordinate z indicates a height of a point 13 above the plane defined by axes 12A and 12B, a second coordinate r indicates a radial distance of the point 13 from axis 11, and a third coordinate θ indicates the angle around axis 11 at which the point 13 is located. Any point in colour space 10 may be identified by the triplet (r, θ, z). In some colour spaces such as colour-opponent colour spaces, r is a chroma coordinate which indicates how colourful the point is (saturation or intensity of colour), z is a lightness coordinate indicating, for example, the perceived brightness of the point relative to a reference white, a luminance or the like, and θ is a hue coordinate which identifies the colour of the point (e.g. a specific red, blue, pink, orange, green, etc.).

Each pixel can be represented by a point in colour space 10. The same point in colour space 10 may be associated with any number of pixels. Points on or within boundary 15 of gamut 14 may be considered to be in-gamut. Points outside of boundary 15 of gamut 14 may be considered to be out-of-gamut. For a display having a gamut 14 defined by boundary 15, point 13 shown in FIG. 2A is out-of-gamut. If, for example, the image data specifies a colour at out-of-gamut point 13, point 13 may be gamut-compressed by mapping it to a corresponding in-gamut point for display.

In certain embodiments, an out-of-gamut point 13 may be mapped to a corresponding in-gamut point along a mapping direction 25. The corresponding in-gamut point may be on or within boundary 15 of gamut 14. The mapping direction 25 and the distance to which point 13 is gamut-compressed in the mapping direction 25 may be determined according to one of several methods. For example, one method of mapping to in-gamut points is to interpolate between two input video data streams (e.g. better and lower quality streams representing the same images), where the gamut of the display generally falls between the gamuts of the two input video data streams. The better quality stream may specify a colour which is out of the gamut of the display, corresponding in the lower quality stream to a colour which is in the gamut of the display. As explained in further detail below with reference to FIGS. 2B to 2D, interpolation may be applied to determine a set of points located between the gamuts of the two input video data streams, for output to the display.

In cases where the gamut of the image data is less than the gamut of the display, the points in colour space 10 specified in the image data may optionally be expanded or extrapolated to take advantage of the relatively greater gamut of the display. For example, one method that may be used is to extrapolate from one or two input video data streams (e.g. better and lower quality streams representing the same images). In certain embodiments, as explained in further detail below with reference to FIGS. 2E to 2G, corresponding colours specified in the better and lower quality streams may be used to guide the mapping of the colours to the gamut of the display.

FIGS. 2B to 2G show results of methods of combining a first set of points $P_{1A}$, $P_{2A}$ representing chrominance values specified in a first video data stream and a corresponding second set of points $P_{1B}$, $P_{2B}$ representing chrominance values specified in a second video data stream to generate a set of points $P_1$, $P_2$ representing chrominance values for output to the display. Chrominance values represented by points $P_{1A}$, $P_{2A}$ and $P_{1B}$, $P_{2B}$ may have been generated or determined during video capture or post-production processing of the video content. FIGS. 2B to 2G illustrate sections through a colour gamut of a display. The sections may be through gamut 14 shown in FIG. 2A, taken perpendicular to axis 11 and at different locations along axis 11. Only a quarter of each section is shown in each drawing for simplicity. Points representing various chrominance values in each section are shown. Points which are outside of boundary 15 are out of the gamut of the display.

Figure 2B:
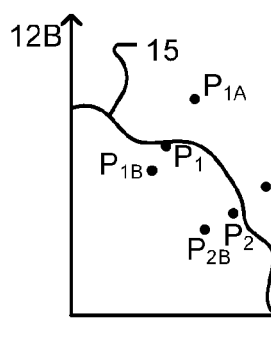
FIGS. 2B to 2G are sections through a colour gamut of a display, showing results of methods of combining streams of image data according to example embodiments.
Figure 2C:
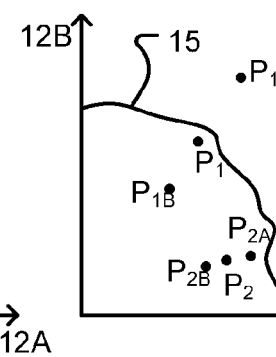
Figure 2D:
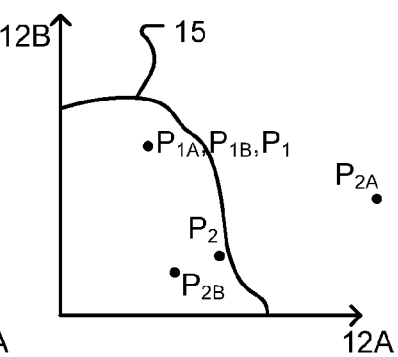

FIGS. 2B to 2D illustrate cases where the display has a gamut 14 which is too limited to display at least some of the chrominance values specified in the first video data stream (e.g. as represented by points $P_{1A}$, $P_{1B}$). However, the chrominance values specified in the second video data stream (e.g. as represented by points $P_{2A}$, $P_{2B}$) are within the gamut of the display. Interpolation may be performed between points $P_{1A}$, $P_{1B}$ and corresponding points $P_{2A}$, $P_{2B}$ to generate a set of in-gamut points $P_1$, $P_2$ representing chrominance values for output to the display. Interpolation may involve determining a weighted combination of the sets of points specified in the video data streams. Interpolation may be guided by factors such as, for example: how far out-of-gamut each point is; how close to boundary 15 each point is; etc.

When applying interpolation, certain colours (e.g. highly saturated colours) may be gamut-compressed to a greater extent than others. Certain "protected" colours (e.g. those selected by the video content creators or editors for a certain effect) may not be gamut-compressed. For example, in the case shown in FIG. 2D, points $P_{1A}$, $P_{1B}$ represent the same colour or chrominance value. The colour specified by points $P_{1A}$, $P_{1B}$ may have been pre-selected by the video content creator during post-production processing, for example. The colour specified by points $P_{1A}$, $P_{1B}$ may be preserved when mapping points $P_{1A}$, $P_{1B}$ to the display (i.e. interpolating between points $P_{1A}$, $P_{1B}$ results in a point $P_1$ which is also located at points $P_{1A}$, $P_{1B}$ as seen in FIG. 2D). By contrast, interpolation between the other points $P_{2A}$, $P_{2B}$ of FIG. 2D (which are located at different points in the colour space) results in a gamut-compressed point $P_2$ located between such points.

In some embodiments, interpolation is performed by weighted averaging. Depending upon the color space in which points are represented, it may be desirable to linearize values prior to combining the values. For example, interpolation of points in the Log(XYZ) color space may comprise performing the calculations:

$$\begin{bmatrix} X \\ Y \\ Z \end{bmatrix}_{INT} = \exp\left(\log\left(\alpha \cdot \begin{bmatrix} X \\ Y \\ Z \end{bmatrix}_A\right) + \log\left(\beta \cdot \begin{bmatrix} X \\ Y \\ Z \end{bmatrix}_B\right)\right) \quad (1)$$

In Equation (1): X, Y and Z are color coordinates; the subscripts INT, A and B represent respectively the interpolated point, a point from the first video data stream and a corresponding point from the second video data stream; and $\alpha$ and $\beta$ are weighing factors (preferably with $\alpha+\beta=1$).

Similarly, interpolation in an XYZ color space may comprise performing the calculations:

$$\begin{bmatrix} X \\ Y \\ Z \end{bmatrix}_{INT} = \alpha \begin{bmatrix} X \\ Y \\ Z \end{bmatrix}_A + \beta \begin{bmatrix} X \\ Y \\ Z \end{bmatrix}_B \quad (2)$$

Interpolation in RGB color space may comprise performing the calculations:

$$\begin{bmatrix} R \\ G \\ B \end{bmatrix}_{INT} = \alpha \begin{bmatrix} R \\ G \\ B \end{bmatrix}_A + \beta \begin{bmatrix} R \\ G \\ B \end{bmatrix}_B \quad (3)$$

where R, G and B are color coordinates. Interpolation in IPT color space may comprise performing the calculations:

$$\begin{bmatrix} I \\ P \\ T \end{bmatrix}_{INT} = \alpha \begin{bmatrix} I \\ P \\ T \end{bmatrix}_A + \beta \begin{bmatrix} I \\ P \\ T \end{bmatrix}_B \quad (4)$$

where I, P and T are color coordinates.

Interpolation in Log(Y)xy color space may comprise performing the calculations:

$$Y = \exp(\alpha \log(Y_A) + \beta \log(Y_B)) \quad (5)$$

and $$\begin{bmatrix} x \\ y \end{bmatrix}_{INT} = \alpha \begin{bmatrix} x \\ y \end{bmatrix}_A + \beta \begin{bmatrix} x \\ y \end{bmatrix}_B \quad (6)$$

where Y, x, and y are color coordinates. In the examples of Equations (1) to (6) interpolation may be performed by one or more programmed data processors, hardware devices, lookup tables, logic pipelines or combinations thereof.

Each of Equations (1) to (6) includes the variable weighting factors $\alpha$ and $\beta$. These weighting factors may be set based upon information regarding the capabilities of the target display. In some embodiments the weighting factors are based upon the capabilities of the target display relative to corresponding capabilities associated with the first and second video data streams.

In some embodiments the weighting factors are selected such that the interpolated data fits within a gamut of the target display for an image (e.g. a frame) or scene. In some such embodiments, values for the weighting factors are determined iteratively. For example, in one embodiment, $\beta$ is increased (with corresponding decreases in $\alpha$) in steps until the image, frame or scene barely exceeds the capabilities of the target display. $\beta$ may optionally be decreased slightly from this point such that the image frame or scene does not exceed the capabilities of the target display.

For example, where the target display has a RGB color space such that values of R, G and B in the range of 0 to MAX are valid, values for the weighting factors for an image frame or scene may be determined iteratively by increasing $\beta$ (and decreasing $\alpha$), converting into the RGB color space of the target display (if necessary) and then determining whether any of the RGB values in the image, frame, or scene exceed MAX. If not, $\beta$ is increased again (with a corresponding decrease in $\alpha$) and the check for RGB values that exceed MAX is repeated. This may be continued until some RGB values in the image, frame or scene do exceed MAX. Then, if desired, $\beta$ may be decreased slightly to a value for which no RGB values (or fewer than some threshold number of RGB values) in the image frame or scene exceed MAX.

Where the interpolation is performed in the color space of the target display (e.g. an RGB color space) then values for $\alpha$ and $\beta$ may optionally be determined by calculation. For example, $\beta$ may be given by:

$$\beta = \max(R_{max}, G_{max}, B_{max}) \quad (7)$$

where $R_{max}$ is given by:

$$R_{max} = \frac{\max(R_B) - 1}{\max(R_B) - \max(R_A)} \quad (8)$$

where the subscripts A and B represent the first and second video data streams and the maxima are taken over the image frame or scene of interest. $G_{max}$ and $B_{max}$ are given by Equation (8) with R replaced by G and B respectively. $\alpha = 1 - \beta$.

Other methods may be used to compress an out-of-gamut point to a corresponding in-gamut point. Some example methods of mapping out-of-gamut points to in-gamut points are described in a co-owned application titled "TONE AND GAMUT MAPPING METHODS AND APPARATUS" filed on Jun. 9, 2010 as U.S. application No. 61/352,444 which is hereby incorporated herein by reference.

Figure 2E:
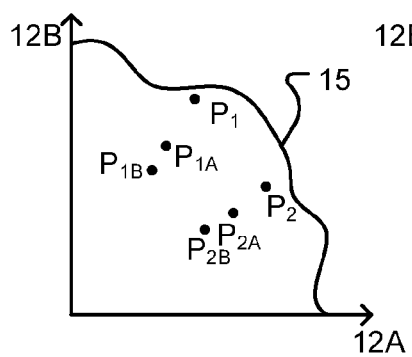
Figure 2F:
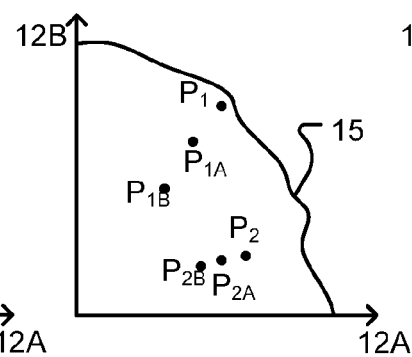
Figure 2G:
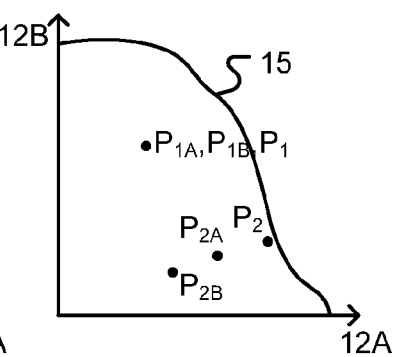

FIGS. 2E to 2G illustrate cases where the display has a gamut 14 which is greater than the gamut of the first and second video data streams. All of points $P_{1A}$, $P_{1B}$ and corresponding points $P_{2A}$, $P_{2B}$ are therefore within boundary 15 of gamut 14. If it is desirable to take advantage of the relatively larger gamut of the display, extrapolation may be performed based on points $P_{1A}$, $P_{1B}$ and corresponding points $P_{2A}$, $P_{2B}$ to generate a set of points $P_1$, $P_2$ representing chrominance values of a generally expanded gamut, for output to the display. Extrapolation may involve determining a weighted combination of the sets of points specified in the video data streams. Extrapolation may be guided by factors such as, for example: how close to boundary 15 each point is; the distance between corresponding points for each set of points $P_{1A}$, $P_{1B}$, $P_{2A}$, $P_{2B}$, etc.

When applying extrapolation to the input video data streams, certain colours may be gamut-expanded to a greater extent than others. Certain protected colours may not be gamut-expanded. In the case shown in FIG. 2G, corresponding points $P_{1A}$, $P_{1B}$ of the input video data streams represent the same colour or chrominance value. If corresponding points $P_{1A}$, $P_{1B}$ have the same colour, then such colour may be preserved when mapping points $P_{1A}$, $P_{1B}$ to the display (i.e. extrapolation based on points $P_{1A}$, $P_{1B}$ results in a point $P_1$ which is also located at points $P_{1A}$, $P_{1B}$ as seen in FIG. 2G). By contrast, extrapolation based on the other points $P_{2A}$, $P_{2B}$ of FIG. 2G (which are located at different points in the colour space) results in a gamut-expanded point $P_2$ within boundary 15 of gamut 14.

In some situations, the format of an input video data stream may not be capable of specifying the gamut-expanded points generated through extrapolation. For such situations, the format of the input video data stream may be converted to a different video data format which is compatible with the display and can support specification of the gamut-expanded points.

The methods described herein are not limited to any particular colour space, such as colour space 10 shown in FIG. 2A. In other embodiments, other types of colour spaces may be used to represent the gamut of image data and of the display.

If the dynamic range of the image data does not match the dynamic range of the display, output luminance values specified in the image data may be mapped to corresponding output luminance values of the display. Mapping of such values may be performed according to one of several methods. For example, one method is to interpolate between two input video data streams (e.g. better and lower quality streams representing the same images), where the dynamic range of the display generally falls between the dynamic ranges of the two input video data streams. Some other methods, which may be applied based on one or more input video data streams, include: contrast reduction (or expansion), compressing (or expanding) the dynamic range of the image data to the dynamic range of the display, tone mapping, and/or the like.

FIG. 3 plots curves 22, 24 representing output luminance values Y as a function of input values X for image data having different dynamic ranges. In the case shown in FIG. 3, the display has a more limited dynamic range than that of the image data (i.e. $Y_{MAX(DISPLAY)} < Y_{MAX(IMAGE\ DATA)}$). If curve 22 represents a plot of output luminance values for input image data, the dynamic range of the input image data may be compressed to match that of the display. Curve 24 may represent a plot of output luminance values for the image data after its dynamic range has been compressed to match the dynamic range of the display.

In other cases, the dynamic range of the display may be greater than the dynamic range of the image data (i.e. $Y_{MAX(DISPLAY)} > Y_{MAX(IMAGE\ DATA)}$). In such cases, the dynamic range of the image data may be expanded to match the dynamic range of the display. Expansion may be performed, for example, as described in the U.S. patent application entitled ENCODING, DISTRIBUTING AND DISPLAYING VIDEO DATA CONTAINING CUSTOMIZED VIDEO CONTENT VERSIONS and filed on 15 Jun. 2010 under application No. 61/355,131, which is hereby incorporated herein by reference.

Figure 4:
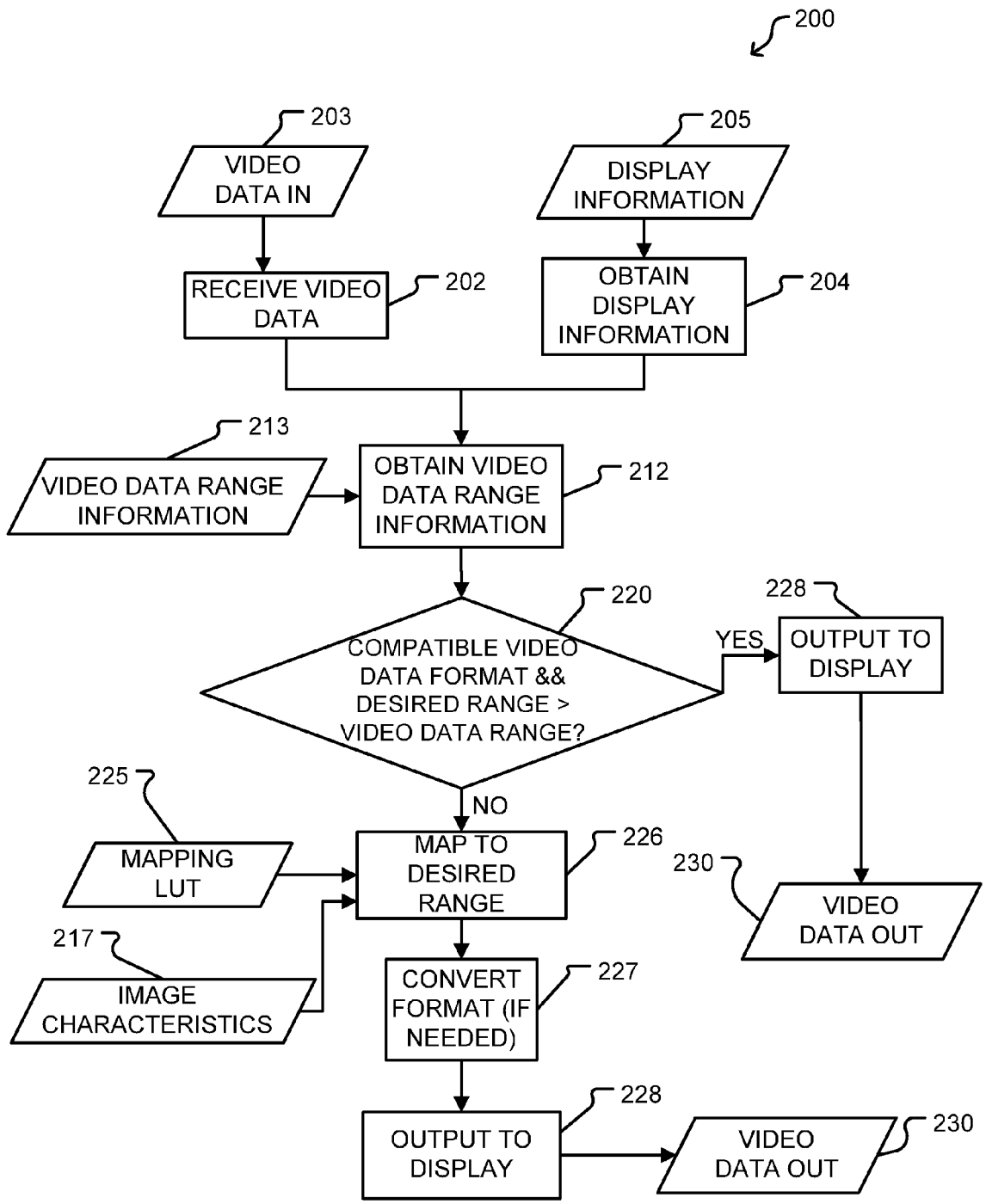
FIG. 4 is a flow chart illustrating a method of processing image data for output to a display according to one example embodiment.

FIG. 4 illustrates a method 200 of processing image data where a single stream of image data (e.g. video data stream) is provided. Method 200 receives video data stream 203 at block 202. Video data stream 203 may be received in a video data format suitable for the type of video content delivery which may be television broadcast over satellite, cable, or high-definition networks; streaming multimedia over IP or wireless networks; or reading a DVD or other storage media, or the like. Video data stream 203 may be received in VDR format or Rec. 709 video data format, for example. Video data stream 203 may be retrieved from a source of video data such as a video signal source. In some embodiments, video data stream 203 may be retrieved from a buffer or other storage media.

At block 204, display information 205 is obtained. Display information 205 may be obtained, for example, from EDID information communicated by the display. Display information 205 may identify, for example: gamut and dynamic range of the display, and compatibility of the display with particular video data formats. In alternative embodiments, display range information is looked up in an online database, entered by a user or the like.

At block 212, video data range information 213 is obtained. Video data range information 213 may identify, for example: gamut and dynamic range of the video data. In particular embodiments, video data range information 213 may be obtained by extracting and decoding metadata carried in video data 203; or by analysing the chrominance and luminance values specified in the video data for the frame or sequence of frames being considered. In alternative embodiments, video data range information is looked up in an online database, entered by a user or the like.

Method 200 proceeds to block 220 by determining whether the video data is in a format which is compatible with the display and by comparing the video range of the video data to the desired range (e.g. the display range). For example, the gamut or dynamic range of the video data may be compared to the gamut or dynamic range of the display as provided by display information 205. If the video data format is compatible with the display and if the desired range exceeds or is equal to the range of the video data, method 200 proceeds to block 228 by outputting video data 203 to the display. A video processor of the display may process video data 203, resulting in output video data 230 which is displayed on the display.

If at the block 220 determination the video data is in a format which is incompatible with the display or the desired range is less than the range of the video data, method 200 proceeds by mapping the range of the video data to the desired range at block 226. In some embodiments, the block 226 mapping is performed according to a predetermined function which maps each input value (e.g. representing colour or luminance of a pixel) to a corresponding output value within the desired range. If the gamut of the video data is being mapped to the gamut of the display, certain colours may be mapped according to a manner based on the extent to which the colours are out-of-gamut of the display and other considerations. Certain colours may be gamut-compressed to a greater extent than other colours. Certain protected colours may not be gamut-transformed in order to preserve creative intent expressed in an original image and/or to provide a transformed image which appears closely similar to the original image. The mapping function may be implemented, for example, using look-up tables (LUT) 225 which map each input value to a corresponding output value.

In other embodiments, the block 226 mapping is guided by image characteristics 217 of video data 203. Such image characteristics 217 may include, for example: the location of light sources in the image; areas of the image which are colour-timed purposely out-of-gamut; protected colours that should not be altered; an image histogram characterizing the image in terms of luminance or gamut; a motion map characterizing the video content to identify objects in motion; director's creative intent settings such as display mode control (e.g. vivid, cinema, standard, professional, etc.), content type (e.g. animation, drama, sports, games, etc.), tone mapping (e.g. customized tone mapping parameters or curves which may be used to guide tone expansion or compression at the display) and gamut mapping (e.g. customized gamut mapping parameters which may be used to guide gamut expansion or compression at the display); and/or the like. Such image characteristics may be obtained from content metadata carried in video data 203.

After mapping to the desired range at block 226 (or in conjunction with mapping to the desired range at block 226), the video data is converted into a video data format which is compatible with the display, if necessary, at block 227. The video data is output at block 228 as output video data 230 for displaying on the display.

In embodiments where it is preferred that the display (instead of the decoder) control mapping of the range of the video data to the display range, the display may communicate a desired range which is greater than or equal to the range of the video data, even in cases where the display range may be less than the range of the video data. As a result, the comparison at block 220 leads directly to output of the video data to the display at block 228. A video processor of the display may then process the video data to map the range of the video data to the display range.

Figure 5:
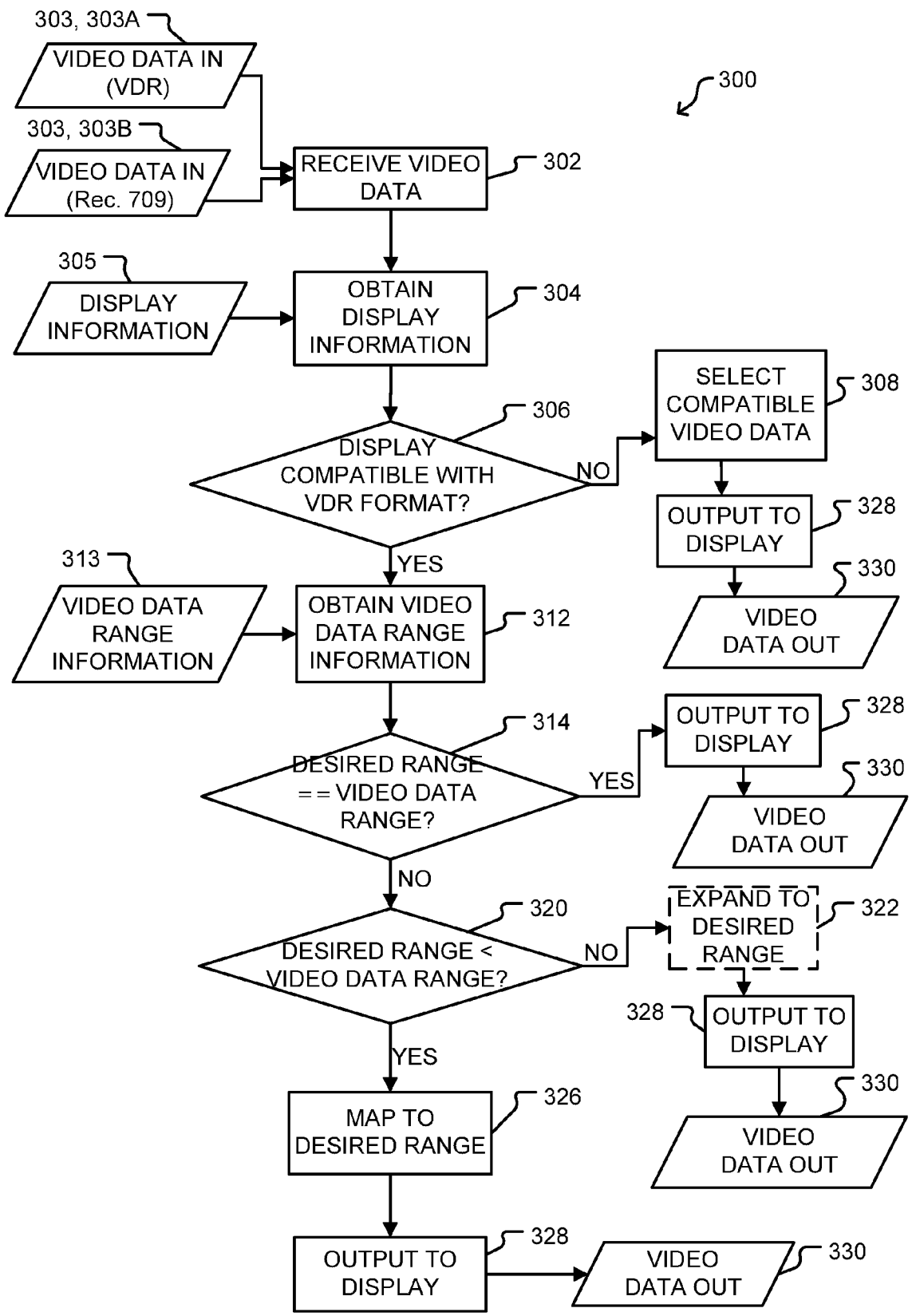
FIG. 5 is a flow chart illustrating a method of processing image data for output to a display according to another example embodiment.

FIG. 5 illustrates a method 300 of processing image data according to another embodiment where multiple input streams of image data (e.g. video data streams) are provided in an input video signal. Method 300 is similar in some respects to method 200, and similar reference numerals are used herein to identify similar steps, except that in method 300, the reference numerals begin with a "3" instead of a "2". At block 302, video data 303 is received. Methods of receiving video data 303 may be similar to those for receiving video data 203 at block 202 of method 200. However, in the FIG. 5 embodiment, method 200 receives two input video data streams 303A, 303B at block 302. Video data streams 303A, 303B may represent the same images encoded in different video data formats and/or image resolutions (e.g. higher and lower quality video data streams). In the illustrated embodiment, video data stream 303A is in VDR format and video data stream 303B is in Rec. 709 video data format. At block 304, display information 305 is obtained. Display information 305 may be obtained, for example, from EDID information communicated by the display. Display information 305 may identify, for example: compatibility of the display with particular video data formats, gamut of the display, dynamic range of the display, display resolution, and/or the like.

At block 306, the display's video data format compatibility as indicated by display information 305 is compared to the video data format of a preferred stream of video data 303. In particular embodiments, the preferred stream of video data 303 may be the higher quality stream of the video data streams or the video data stream that provides the most content information. In the illustrated embodiment, the preferred stream is video data stream 303A, and block 306 determines whether the display is compatible with the VDR format of video data stream 303A. If the display is not identified as VDR-compatible, a video data stream which is compatible with the display is selected at block 308 (e.g. video data stream 303B in Rec. 709 video data format may be selected) and output to the display at block 328 as output video data 330. As such, method 300 enables backwards-compatibility with non-VDR displays or, more generally, displays which are not able to play back video data in a preferred video data format.

If the display is identified as VDR-compatible, method 300 proceeds to block 312 by obtaining video data range information 313 for the preferred stream of video data 303A. Methods of receiving video data range information 213 may be similar to those described in relation to block 212 of method 200. At blocks 314 and 320, the range of video data 303A is compared to the desired range (e.g. the display range). If the desired range is equal to the range of video data 303A (block 314), method 300 proceeds to block 328 by outputting video data 303A to the display. A video processor of the display may process video data 303A, resulting in output video data 330 which is displayed on the display.

In some cases, the display has a gamut and/or dynamic range that exceeds the gamut and/or dynamic range of video data 303A. If the desired range is greater than the range of video data 303A as assessed at block 320, method 300 proceeds by optionally expanding the range of the video data to or toward the desired range at block 322 and then outputting the video data to the display at block 328 as output video data 330.

The block 322 expansion may be implemented using lookup tables or other suitable methods which map each input value (e.g. representing colour or luminance of a pixel) to a corresponding output value within the desired range(s). There may be different desired ranges for different colour coordinates (e.g. hues). The block 322 expansion may involve extrapolating the video data from one or both streams of video data 303A, 303B. Extrapolation of chrominance and luminance values may be performed in accordance with the techniques described in relation to FIGS. 2E to 2G, for example. The block 322 expansion may be guided by the image characteristics of video data 303. The block 322 expansion may be performed by the decoder or by the display (e.g. video processor of the display). The block 322 expansion may expand the video data to values within the video data format of video data 303A, or to a different video data format if needed (e.g. if the video data format of video data 303A is not capable of specifying the expanded values).

If the desired range is less than the range of the video data, method 300 proceeds to block 326 by mapping the range of the video data to the desired range. According to certain embodiments, the block 326 mapping of method 300 may be performed by interpolating between the video ranges of the streams of video data 303A, 303B, so as to provide output video data 330 having a video range which is intermediate to the video ranges of video data 303A, 303B. The interpolated video data results may be characterised by a video range which is closer to matching the display capabilities than either of video data 303A, 303B. Interpolation of chrominance and luminance values may be performed in accordance with the techniques described in relation to FIGS. 2B to 2D, for example.

In other embodiments, similarly to the block 226 mapping of method 200, the block 326 mapping of method 300 may be implemented by LUTs and/or may be guided by image characteristics which may be obtained from content metadata carried in video data 303A.

After mapping to the desired range at block 326, the video data is output at block 328 as output video data 330 for displaying on the display.

In embodiments where it is preferred that the display (instead of the decoder) control mapping of the range of the video data to the desired range, the display may communicate a desired range which is greater than or equal to the range of the video data, even if the actual display range is less than the range of the video data. If the display communicates a desired range greater than or equal to the range of the video data, then, according to particular embodiments, video data is output to the display (without the decoder performing any mapping of the video range to the display range). A video processor of the display may then process the video data and map the range of the video data to the display range (e.g. the video processor may perform the step of block 328 of method 300).

Figure 6:
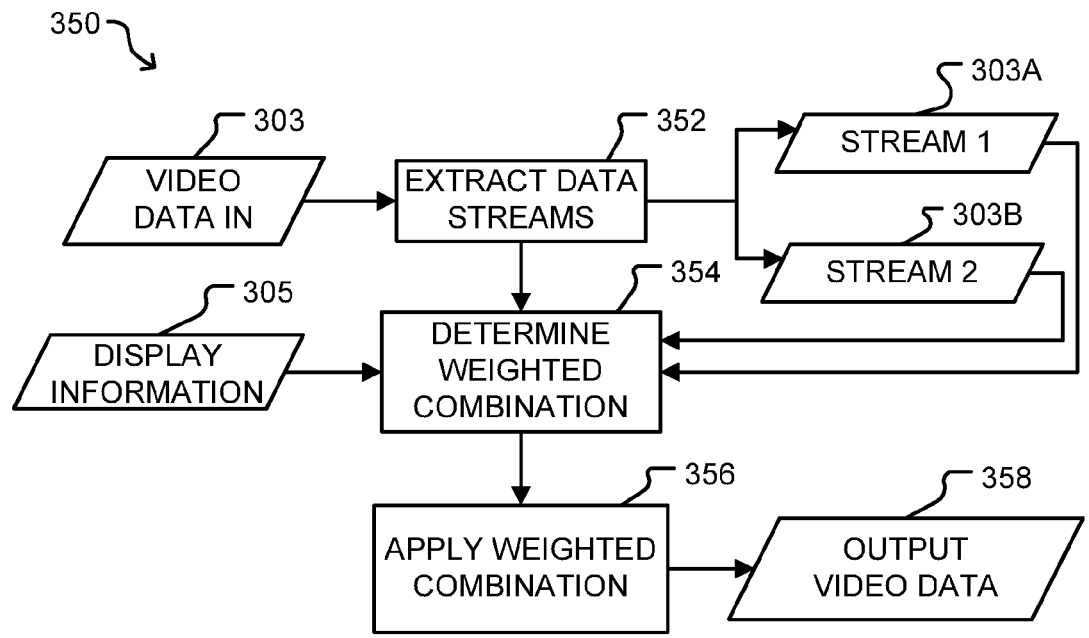
FIG. 6 is a data flow diagram illustrating combining streams of input image data to generate image data for output to a display.

FIG. 6 illustrates a method 350 of combining input video data streams to determine output video data for a display. Method 350 is a method of using input video data streams having different video ranges to provide output video data having a video range which is more closely matched to the display range than the video ranges of the input video data streams. Method 350 may be applied where there are input video data streams having video ranges which are greater than and/or more limited than the display range. Method 350 may be performed to determine one or more of: chrominance output values and luminance output values for display.

Method 350 begins at block 352 by extracting video data streams from the input video signal providing video data 303. In the illustrated embodiment, method 350 extracts two streams of video data 303A, 303B from the input video signal (e.g. higher and lower quality streams). In embodiments in which the input video signal carries more than two data streams, the two streams of video data 303A, 303B may be the streams having a range characterised by limits or boundaries which are closest to and on either side of the limits or boundaries of the desired range. The limits or boundaries may be luminance or gamut boundaries, for example.

Method 350 may apply a weighted combination of values specified in the streams of video data 303A, 303B to determine corresponding output values for display. The values may be chrominance values or luminance values. At block 354, the weights of the weighted combination are determined. The weights may be determined based on the relative ranges of the two streams of video data 303A, 303B and the display (e.g. as determined from display information 305 that is communicated by or received from the display).

In some embodiments, each color coordinate is mapped according to a function of the form $V_{out}=W_1V_1+W_2V_2$ where $W_1$ and $W_2$ are weights, $V_1$ is the value of one coordinate of a point in the first video data and $V_2$ is the value of the one coordinate of the point in the second video data. The weights may be predetermined and may be based on relative capabilities of the target display and capabilities associated with the first and second video data.

In some embodiments the same weights are used for all color coordinates, in other embodiments different weights are used for different color coordinates. An advantage of using the same weights for all color coordinates is that colors are mapped symmetrically. An advantage of using different weights for different color coordinates is that usage of the gamut of the target display may be maximized. In some embodiments, the corresponding output values are determined in a color space comprising a luminance coordinate and one or more chroma coordinates. In some such embodiments, one set of weights may be applied to determining output values for the luminance coordinate and another set of weights may be applied to determining output values for the chroma coordinate(s).

Method 350 proceeds to block 356 by applying the weights identified in block 354 to combine values specified in the two streams of video data 303A, 303B. The weighted combination of values specified in the two streams of video data 303A, 303B is used to generate video data 358 for output to the display. Application of the weighted combination may result in interpolation between the video data streams, or extrapolation from the video data streams. In the case of a weighted combination which interpolates between streams of video data 303A, 303B, video data 358 has a video range characterised by limits which are in between those of the video ranges of the streams of video data 303A, 303B. In the case of a weighted combination which extrapolates from streams of video data 303A, 303B, video data 358 has a video range characterised by limits which are greater than those of the video ranges of the streams of video data 303A, 303B.

Figure 7:
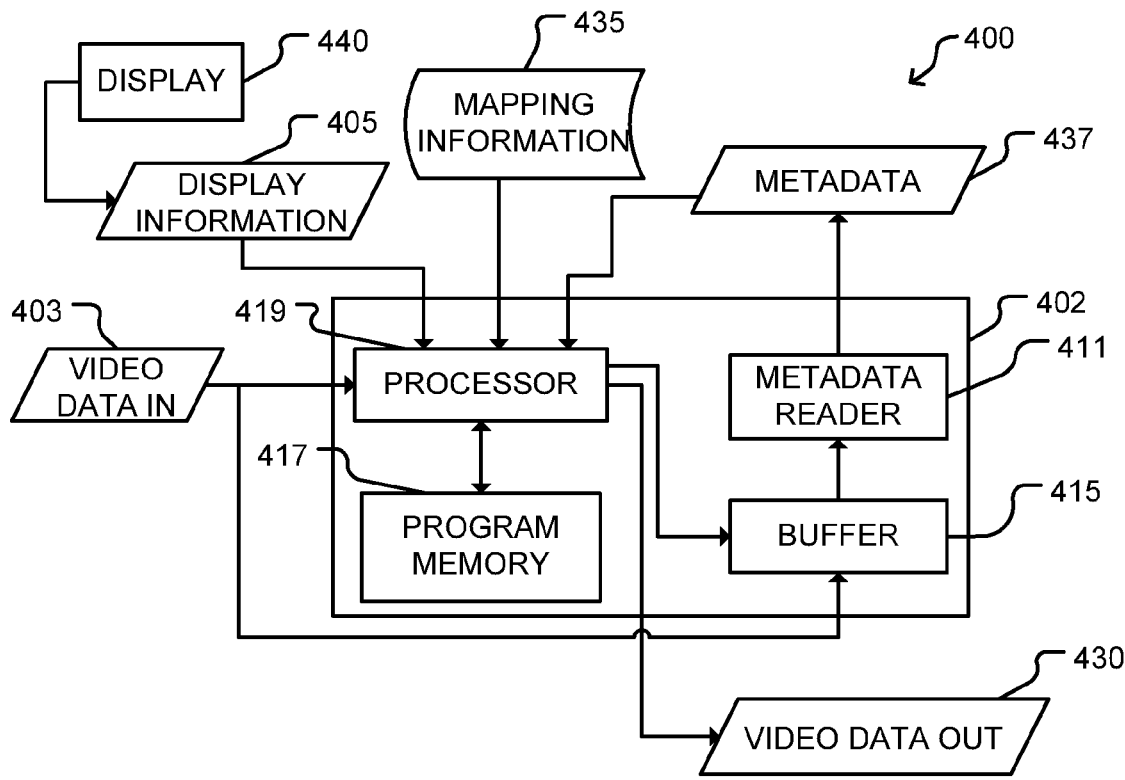
FIG. 7 schematically illustrates a system according to an embodiment which may be used to implement one or more of the methods described herein.

FIG. 7 schematically illustrates a system 400 which may be used to implement one or more of the methods described herein. System 400 has a decoder 402, and a display 440 for displaying video data processed by decoder 402. Decoder 402 has a program memory 417 and a buffer 415 accessible to a processor 419.

Decoder 402 receives video data 403. Decoder 402 may store the received video data in buffer 415 for processing by processor 419. Processor 419 receives display information 405 from display 440. Processor 419 may also receive mapping information 435 (e.g. mapping LUTs). Mapping information 435 may be retrieved from a memory accessible to processor 419, or it may be retrieved from another source of the mapping information. Processor 419 receives content metadata 437 which may specify information about the image such as image characteristics. Content metadata 437 may be provided to processor 419 by a metadata reader 411 which extracts and decodes the metadata carried in the video data.

Processor 419 calls and executes software functions stored in program memory 417, and applies such functions to video data 403, display information 405, mapping information 435 and content metadata 437. The software instructions provided by the software functions in program memory 417 may carry out the steps of methods 200 (FIG. 4), 300 (FIG. 5) and/or 350 (FIG. 6) to process the input video data 403 to provide output video data 430 having a range which is adapted to display 440's capabilities.

Figure 8A:
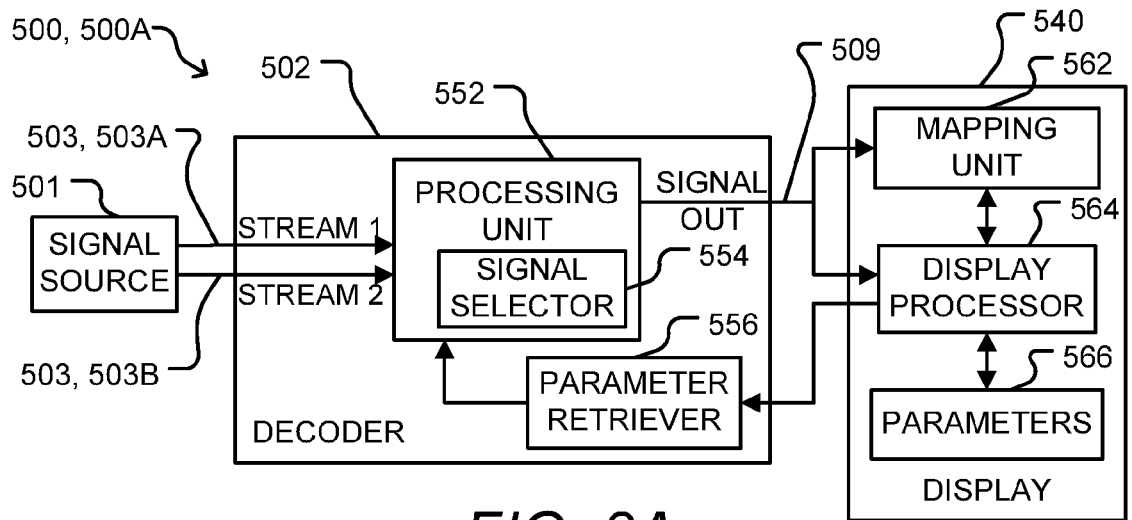
FIGS. 8A, 8B and 8C schematically illustrate systems according to various embodiments for different display capabilities.
Figure 8B:
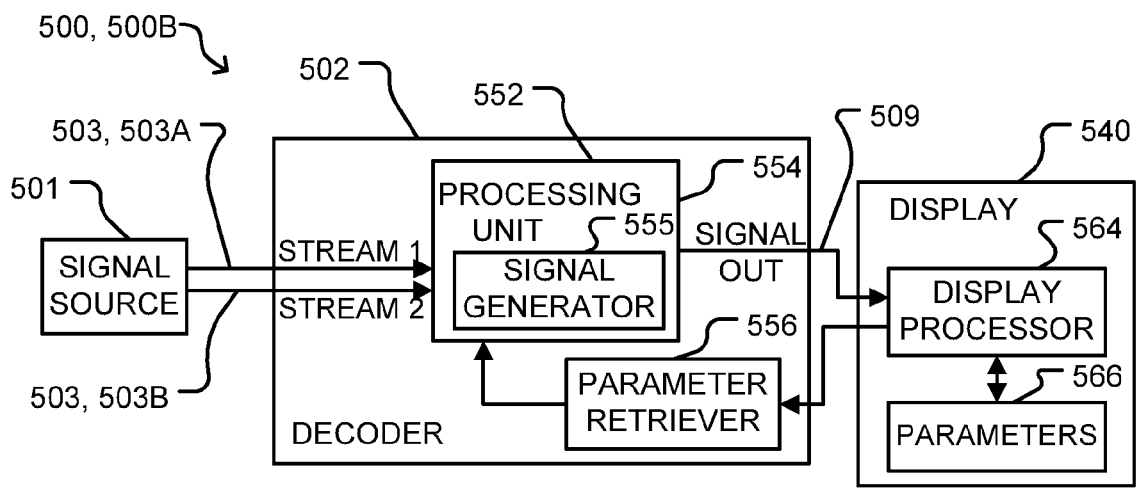
Figure 8C:
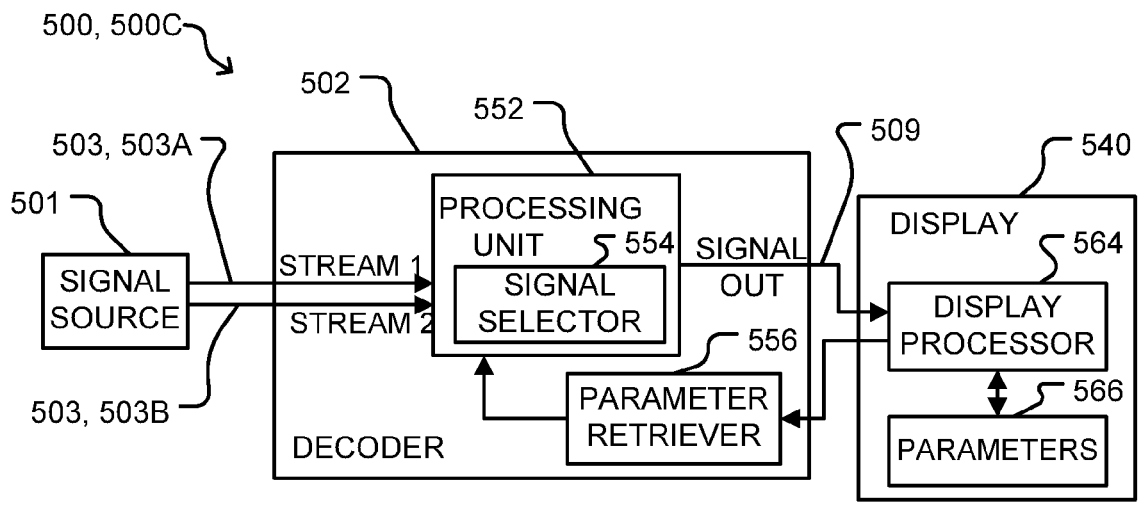

FIGS. 8A, 8B and 8C illustrate a system 500 according to various embodiments for different display capabilities. Each system 500 includes a decoder 502 for receiving an input signal from a signal source 501 and transmitting an output signal 509 to a display 540. The input signal provides two streams of image data 503A, 503B (collectively, image data 503). Streams of image data 503A, 503B may be higher and lower quality streams. Decoder 502 includes a processing unit 552 which may process the image data 503 prior to outputting the image data by way of output signal 509 to display 540. Decoder 502 includes a parameter retriever 556 for communicating with display 540 to obtain display 540's display parameters 566 (e.g. as provided by EDID information from display 540). In particular embodiments, signal source 501 may comprise a video signal source and image data 503 may comprise video data.

In the FIG. 8A embodiment (system 500A), display 540 incorporates a mapping unit 562 capable of mapping the ranges of the image data streams to those of the display. Display 540 may transmit exaggerated or false display parameters 566 to decoder 102's parameter retriever 556. Parameters 566 may indicate that display 540 is compatible with a high quality or advanced image data format and is capable of the maximum display ranges that may be specified by that format. In response to such parameters, without adjusting any image data ranges decoder 502 outputs signal 509, including the highest quality stream of image data 503, to display 540. Output signal 509 may, in some embodiments, include both streams of image data 503A, 503B. In other embodiments, output signal 509 may include only one stream of image data 503 (i.e. the highest quality stream of image data) as extracted from the input signal by a signal selector 554. Display 540's processor processes image data 503 to map the ranges of the video data stream(s) to those of the display. Methods of mapping may include interpolation or extrapolation based on one or more streams of the image data.

In the FIG. 8B embodiment (system 500B), display 540 communicates actual display parameters 566 to decoder 502's parameter retriever 556. Decoder 502 includes a signal generator 555 configured to combine streams of image data 503A, 503B to provide an output signal 509 for output to the display. Based at least in part on display parameters 566 and the ranges of the streams of image data 503A, 503B, signal generator 555 may determine a weighted combination of values specified in the image data streams and apply such weighted combination to map ranges of the streams of image data 503A, 503B to those of display 540. The mapping may include extrapolation or interpolation of image data 503A, 503B. The FIG. 8B embodiment may be applicable in cases where display 540 has a range which is in between the ranges of image data 503A, 503B, or greater than the ranges of image data 503A, 503B, and it is desirable for decoder 502 to generate a custom image signal for the display based on the display capabilities and the ranges of the image data 503A, 503B.

In the FIG. 8C embodiment (system 500C), display 540 communicates actual display parameters 566 to decoder 502's parameter retriever 556. Parameters 566 may indicate that display 540 is compatible with the image data format of the lower quality image data stream (e.g. image data 503B), and is at most capable of displaying the lower quality image data stream. In response to such parameters, decoder 502's signal selector 554 extracts the lower quality stream of image data 503B, and outputs this image data by way of output signal 509 to display 540. In certain embodiments, display 540 is not capable of communicating display parameters 566 to decoder 502. If such is the case, then a message communicated by parameter retriever 556 to display 540 to attempt to retrieve display parameters 566 returns no response; and as such, decoder 502 may assume that display 540 is at most capable of displaying the lower quality image data stream. The FIG. 8C embodiment may be applicable in cases where display 540 is a "legacy" display which is incompatible with image data formats of higher quality image data streams and/or has limited gamut and/or dynamic range. Decoder 502 of FIG. 8C is backwards compatible with such legacy displays.

According to particular embodiments, the same decoder 502 may be configurable to handle the different situations explained above in relation to FIGS. 8A, 8B and 8C. Decoder 502 may perform different steps as explained, depending on whether display parameters 566 are exaggerated or actual or whether the display parameters 566 (or lack thereof) indicate a legacy display.

FIGS. 9A through 9F illustrate a number of example implementations which involve providing a video signal appropriate for display on a target display. These example implementations may incorporate features as described in the U.S. patent application entitled DISPLAY MANAGEMENT METHODS AND APPARATUS filed on 24 Feb. 2010 under No. 61/307,547 which is hereby incorporated herein by reference.

Figure 9A:
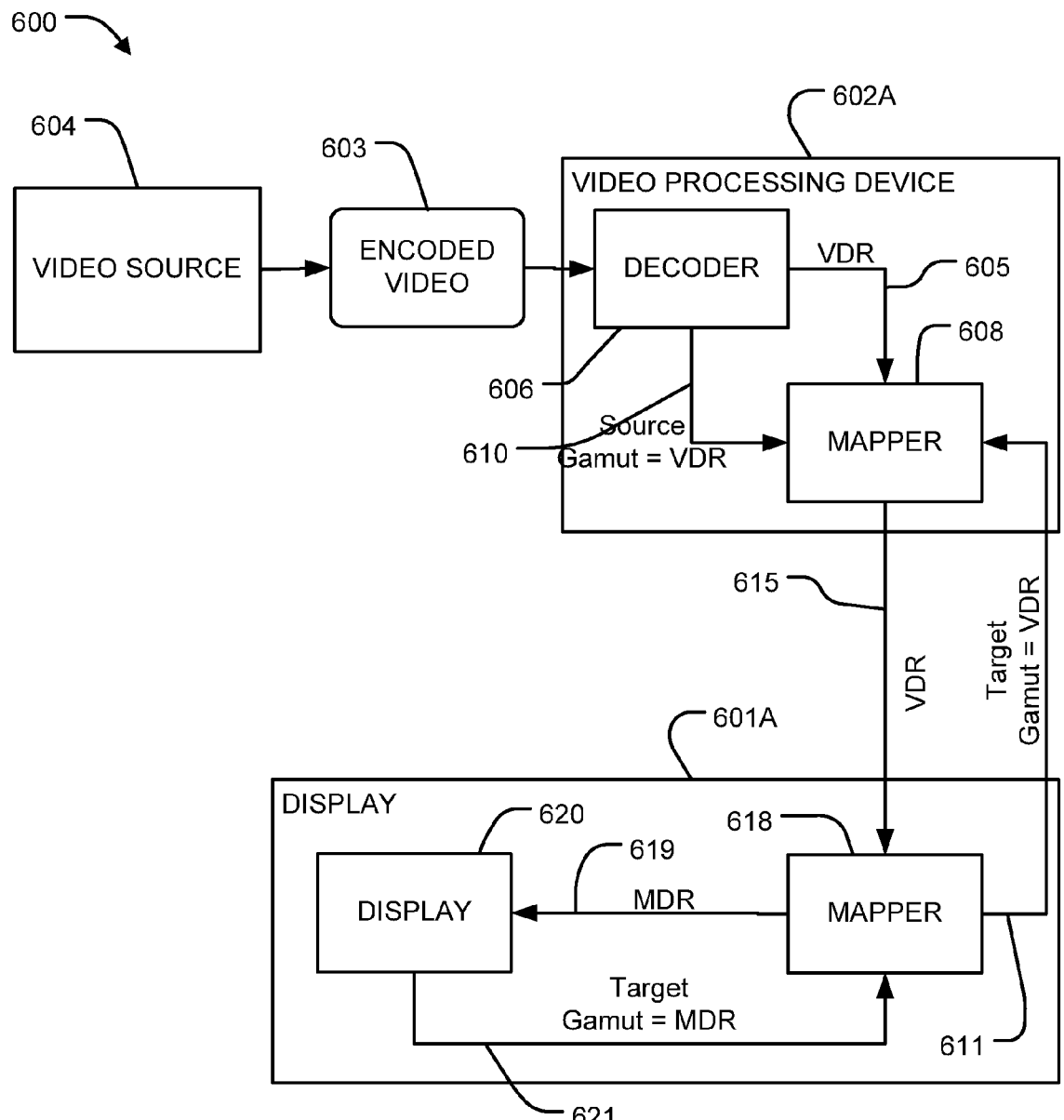
FIGS. 9A to 9F illustrate specific implementations of apparatus according to some embodiments which may be used to implement one or more of the methods described herein in specific example applications.

FIG. 9A shows a system 600 comprising a display 601A connected to receive a signal 603 from a video processing device 602A. Video processing device 602A is connected to receive video signal(s) 603 from a video source 604. Video source 604 may be internal or external to device 602A. Video processing device 602A comprises a decoder 606 and a first mapper 608. Decoder 606 decodes video signal 603 and provides the decoded video signal 605 to mapper 608.

Mapper 608 is connected to receive a signal 610 from decoder 606. Signal 610 indicates the fidelity of the video data being provided to first mapper 608. Signal 610 may, for example, comprise information indicating the gamut, dynamic range and/or other characteristics of video signal 605. Signal 610 may be embedded in video signal 603 (e.g. in the form of metadata), transmitted together with video data 603 or provided by a separate path. In some embodiments, source gamut is included with encoded video data 603, decoded by decoder 606 and passed to Mapper 608. If source gamut information is not available or not provided then mapper 608 may be configured to assume that the gamut of video data 605 is a default gamut. For example, it may be assumed that the source gamut has minimum and maximum at $10^{-4}$ and $10^4$ nits.

First mapper 608 is also configured to receive a signal 611 from display 601A indicating the nature of video signal that display 601A should receive. In some embodiments, one or both of signals 610 and 611 comprises EDID (Extended Display Identification Data), DisplayID data, or the like.

Based on signals 610 and 611, first mapper 608 outputs a video signal 615 to display 601A. In the illustrated embodiment, signal 610 indicates that signal 605 is a VDR signal and signal 611 indicates that signal 615 should be a VDR signal and so first mapper 608 passes signal 605 through as signal 615.

Display 601A comprises a second mapper 618. Second mapper 618 receives signal 615 and outputs a signal 619 to display electronics 620. Display electronics 620 generates a signal 621 indicating the nature of video signal 619 that display electronics 620 should receive. Second mapper 618 maps signal 615 to signal 619. Display electronics 620 display the image. In the alternative to signal 621 second mapper 618 may be pre-configured to map signal 615 to the desired signal 619.

An advantage of the embodiment depicted in FIG. 9A is that second mapper 618 may be optimized to deliver the desired signal 619 and signal 619 can be generated directly from high fidelity (e.g. VDR) image data even though display electronics 620 cannot directly utilize the VDR image data.

Figure 10:
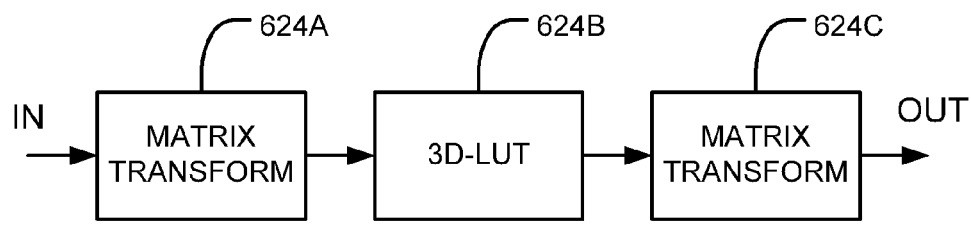
FIG. 10 is a block diagram illustrating one possible architecture for a mapper.

Mappers 608 and 618 may have any of a wide variety of constructions and may be implemented in software and/or hardware. In some embodiments, as illustrated by FIG. 10, mappers 608 and/or 618 comprise hardware and/or software that provides: a first matrix transformation 624A into a working color space; a 3D lookup table 624B that receives coordinates of pixels in the working color space and outputs transformed pixel values; and a second matrix transformation 624C that transforms from the working color space to a color space of the output signal. In some embodiments the working color space comprises an LMS color space although other color spaces may be used.

In some embodiments, the transformation performed by 3D LUT 624B (or other apparatus for performing the transformation) performs the transformation in a non-linear manner. For example, the transformation function for each channel (e.g. each color coordinate) may have the form of a sigmoidal curve. The sigmoidal curve may, for example, be centered on the logarithmic mid-greys of the source and target gamuts. The curve may have a first end corresponding to the minimums of the source and target gamuts and a second end corresponding to the maximums of the source and target gamuts. Saturation may be adjusted by horizontally offsetting the curves for each channel (where the X-axis or horizontal axis represents source values and the Y-axis or vertical axis represents the values to which the source values are mapped. Other transformation algorithms as are known in the art are equally suitable for many applications.

Figure 10A:
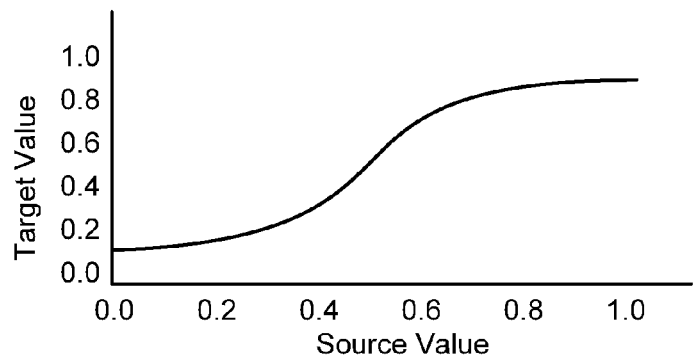
FIG. 10A shows an example non-linear mapping.

FIG. 10A shows an example of a sigmoidal curve 650. In this example, the x-axis spans the full color gamut (0 to 1 for the illustrated channel) but the target is only capable of a portion of the gamut, for example 0.1 to 0.9. The center of curve 650 in the x-axis direction is assumed or given by metadata, in this example 0.5. The center of curve 650 in the y-axis direction may be determined by the range of the target display and optionally on other factors such as ambient conditions at a location where images will be displayed, for this example 0.6. Curve 650 is sloped in the center to preserve contrast and curves gently into the top and bottom ranges of the target.

Figure 9B:
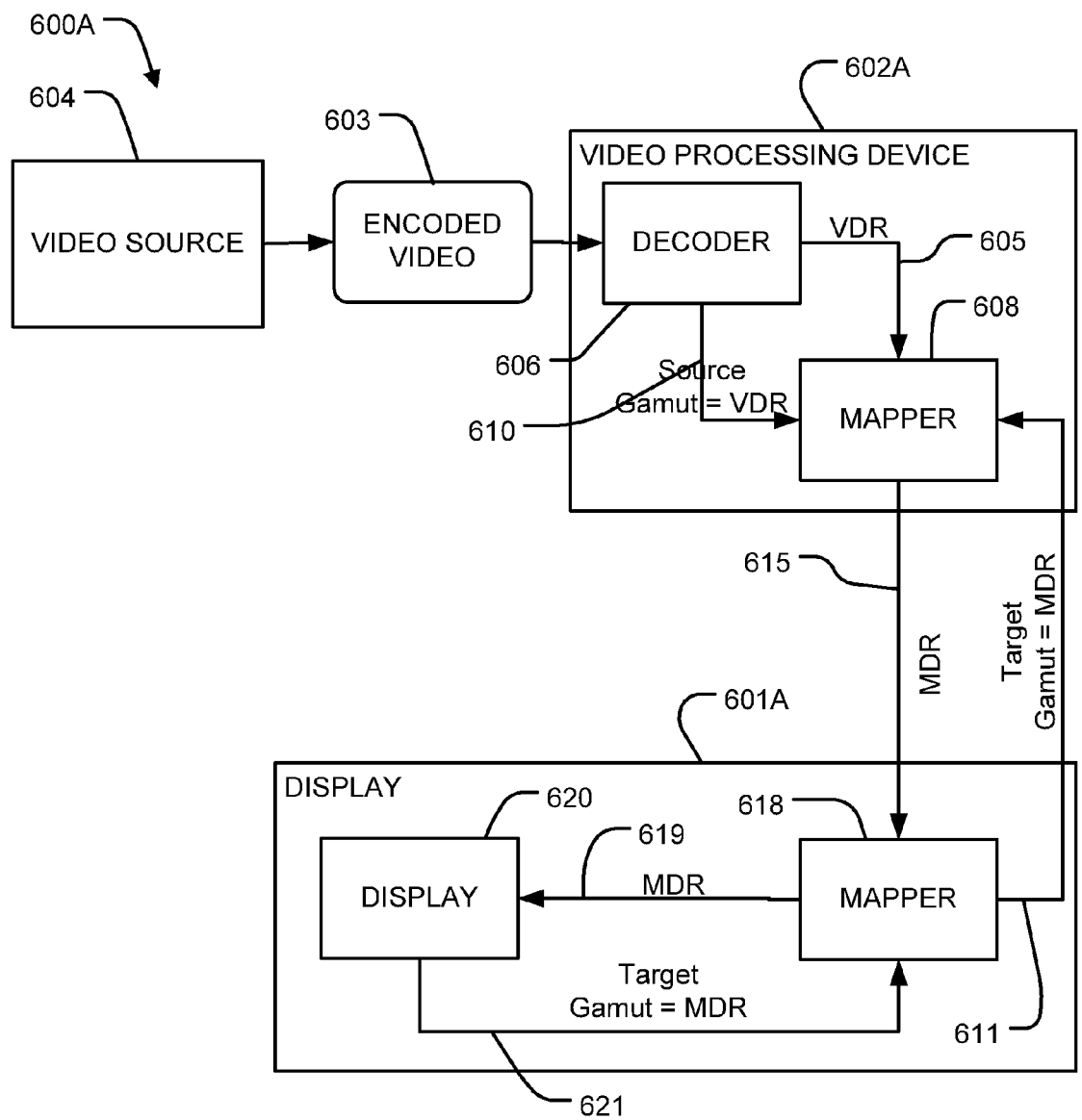

FIG. 9B shows system 600 which has been reconfigured such that signal 611 indicates that display 601A should receive video in a different format (for example a format in which the video data is within a narrower gamut and/or has a smaller dynamic range). The different format is identified as MDR in this example. In the FIG. 9B embodiment, first mapper 608 transforms VDR video data 605 into MDR video data 615. Since Video data 615 is already in the desired format, second mapper can pass video data 615 through as video data 619. An advantage of the embodiment in FIG. 9B is that a user of display 601A can take advantage of first mapper 608 in the event that first mapper 608 is configured to provide a transformation from VDR to MDR data that is preferable in any way over the transformation(s) for which mapper 618 is configured to provide. In some embodiments, a display such as display 601A is configured to allow a user to select between generating a signal 611 which will result in higher-fidelity video data being delivered to the display 601A for transformation by mapper 618 and a signal 611 which will result in lower-fidelity video data being delivered to the display 601A with the transformation being performed by first mapper 708. In some embodiments, one mode selects a signal 611 indicating that display 601A has capabilities that are greater than the actual capabilities of display 601A. For example, the signal 611 may indicate that the display 601A can display colors in a broader gamut than display 601A can reach and/or has a higher dynamic range than display 601A actually has.

Figure 9C:
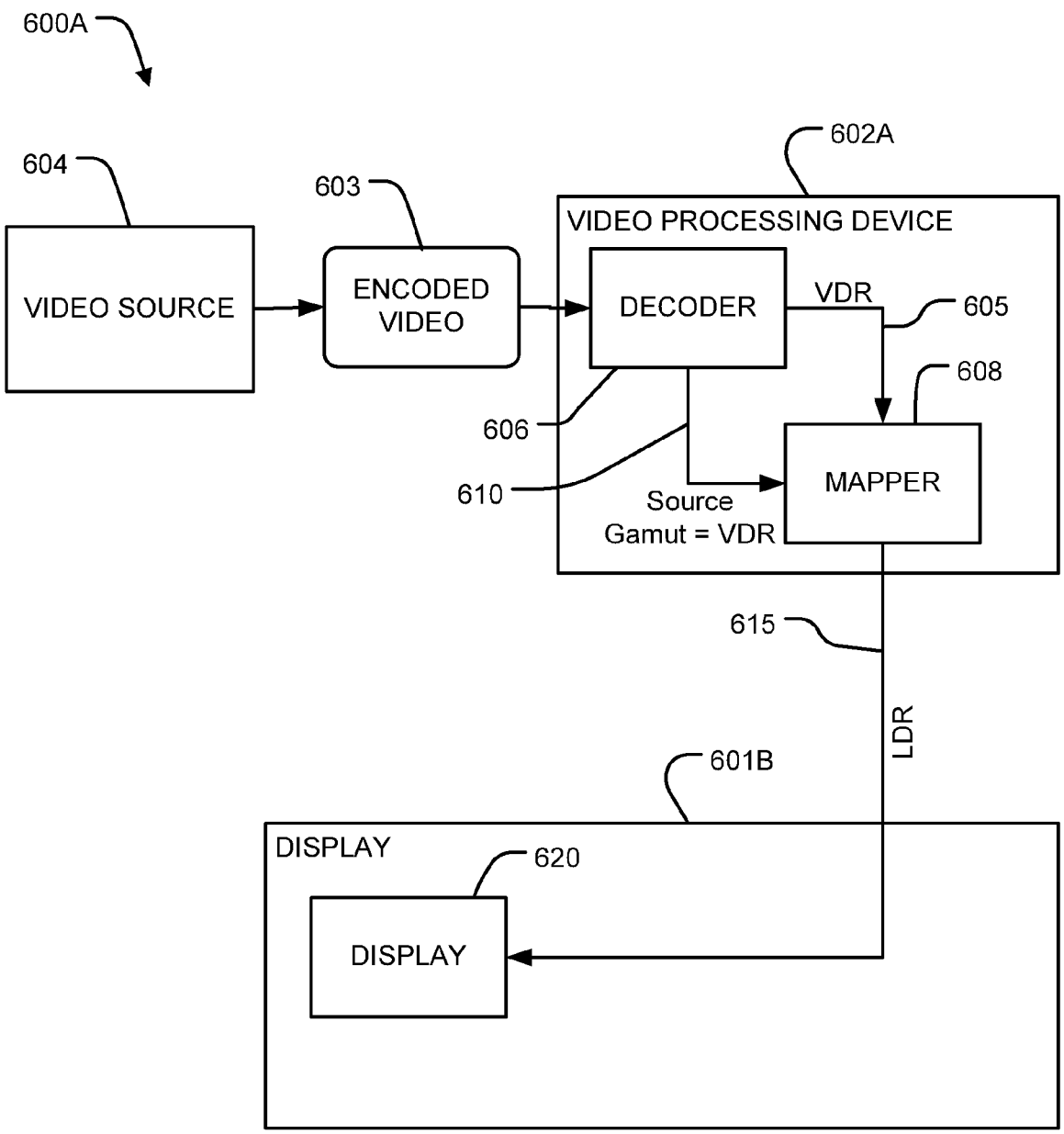

FIG. 9C shows a system 600A which is like system 600 except that display 601A has been replaced by a display 601B that does not generate a signal 611. In this embodiment, first mapper 608 is configured to respond to the lack of signal 611 by transforming input signal 605 into a lowest-common denominator signal 615 (indicated here by LDR). Display 601B may, for example, comprise a legacy display.

Figure 9D:
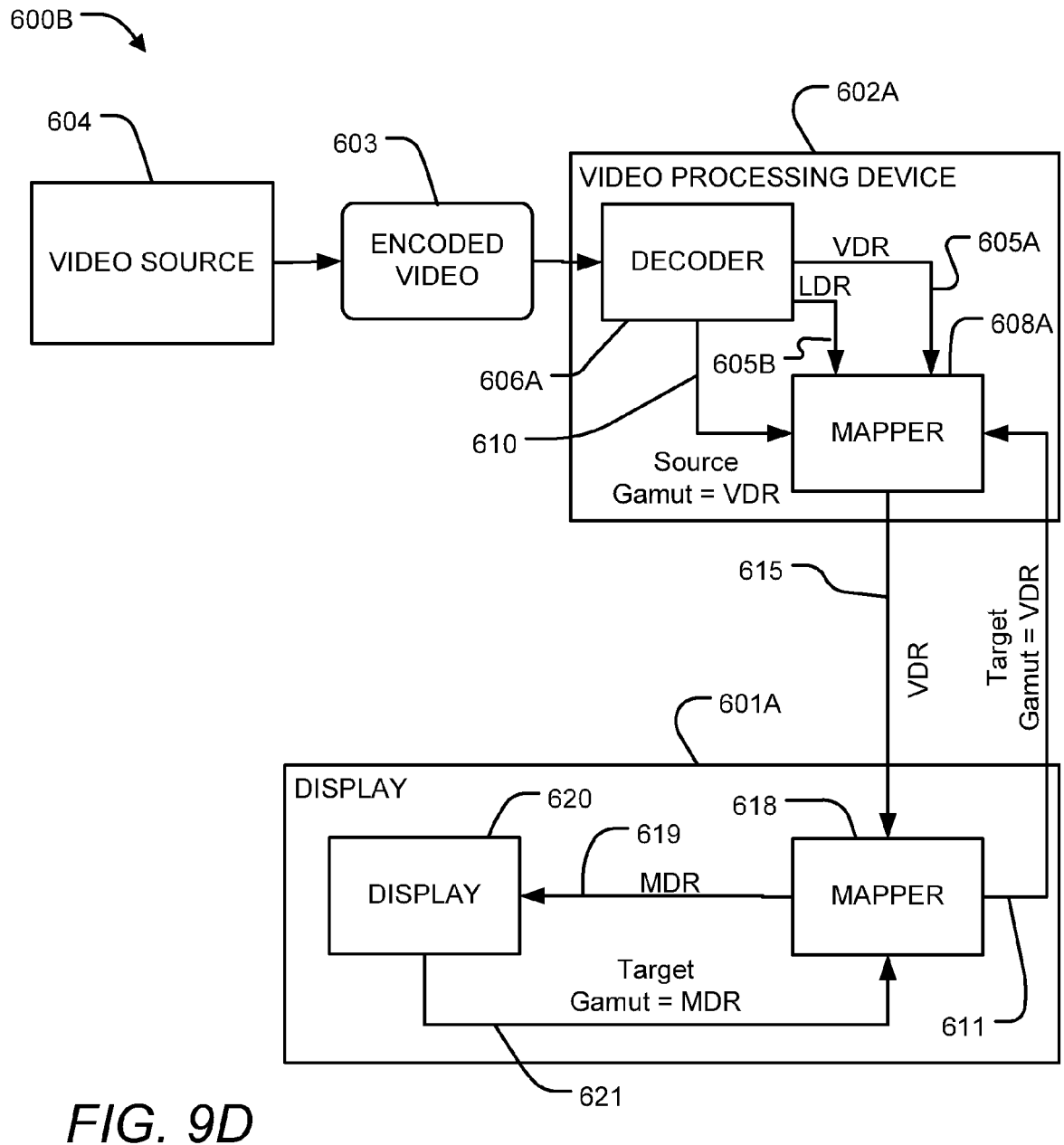
Figure 9E:
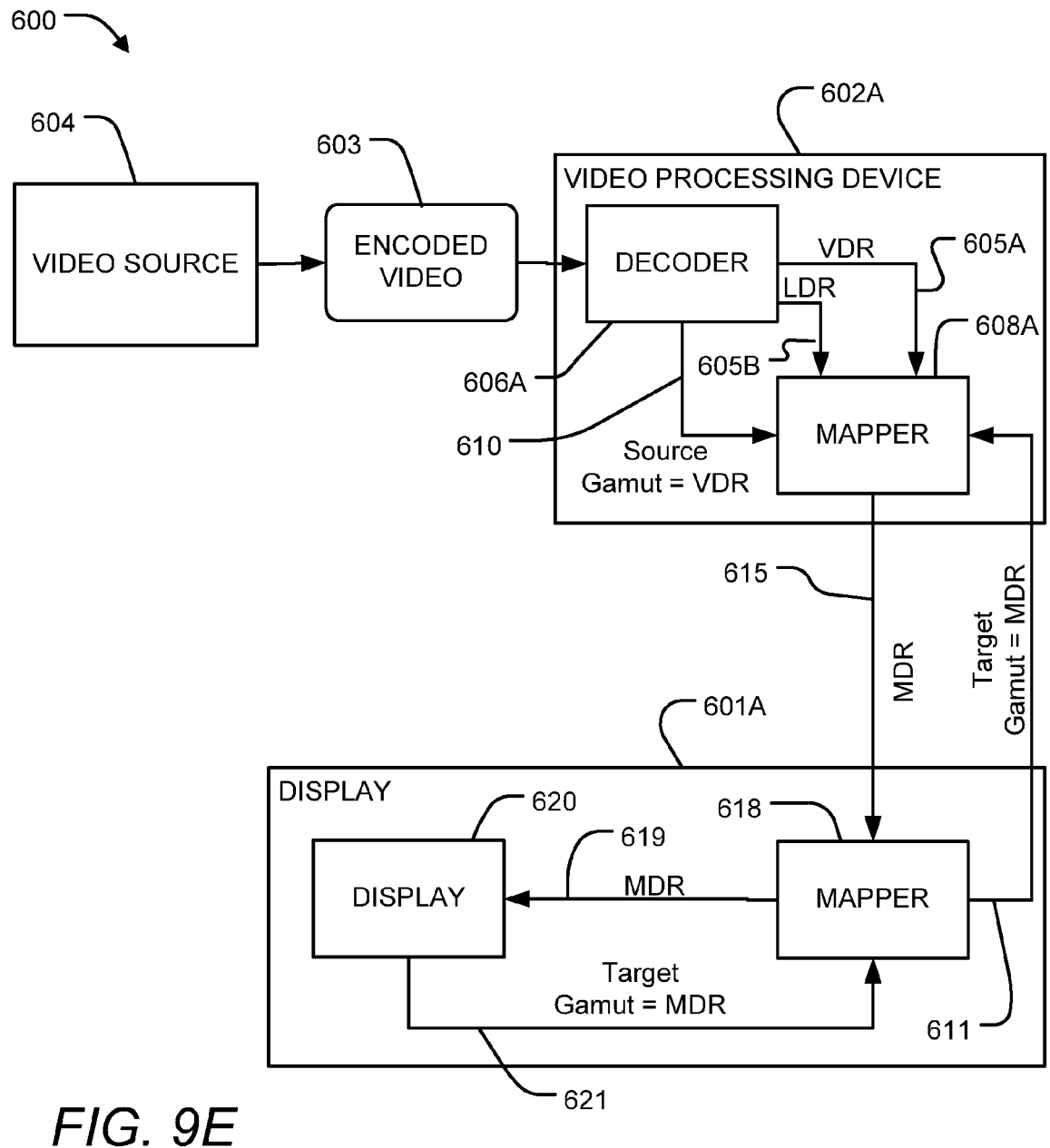
Figure 9F:
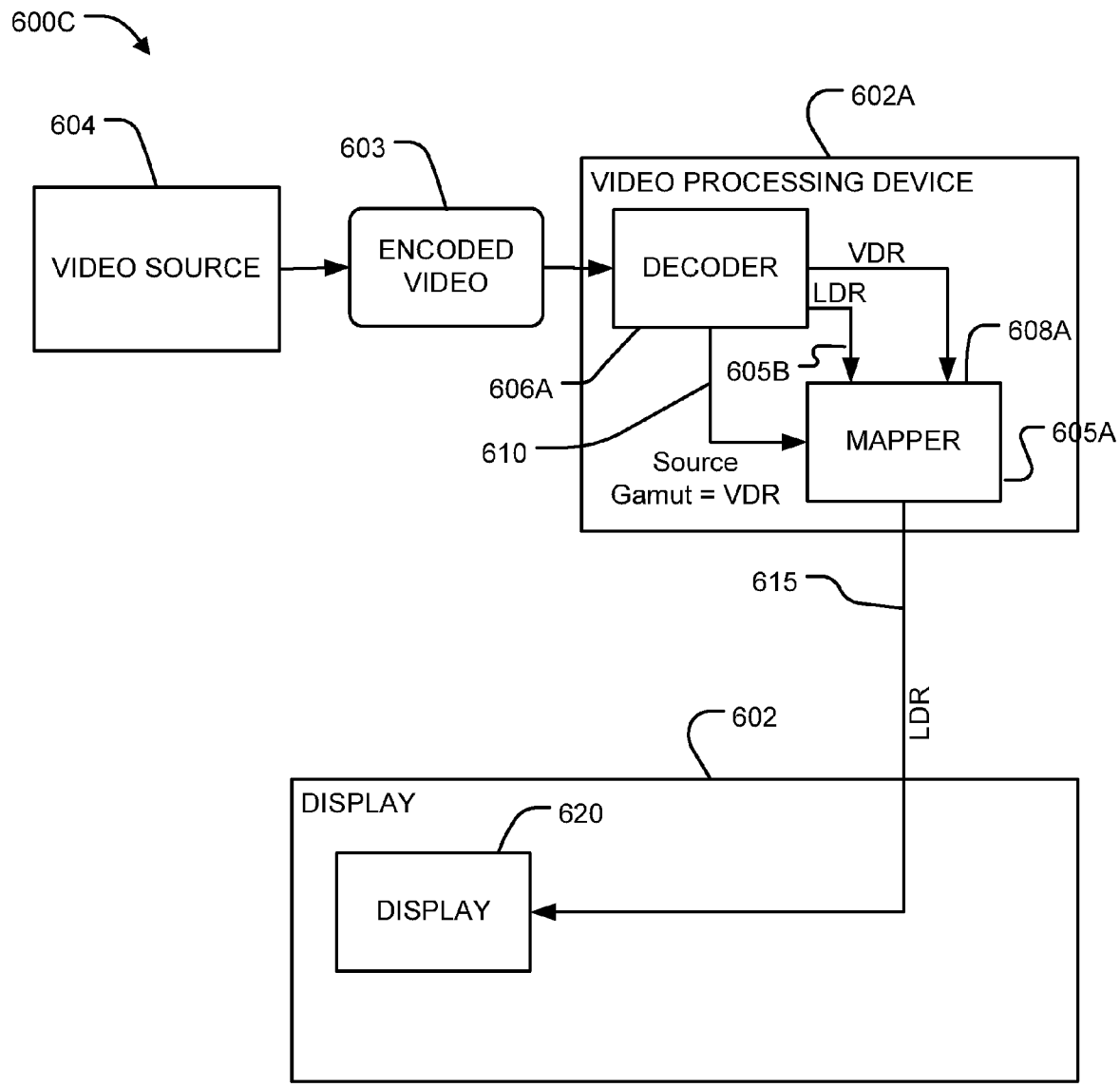

FIGS. 9D through 9F are similar to FIGS. 9A through 9C respectively except that encoded video signal 603 has been replaced with a video signal 603A that encodes first and second video data 605A and 605B, decoder 206 has been replaced with a decoder 206A that outputs first and second video data 605A and 605B, and first mapper 608 has been replaced with a mapper 608A that can be configured to interpolate/extrapolate between first and second video data 605A and 605B.

In system 600B of FIG. 9D, first mapper 608A is configured to pass first video data 605A (VDR data) through to display 601A in response to signal 611 indicating that display 601A should receive high-fidelity video data. In system 600C of FIG. 9F, first mapper 608A is configured to pass second video data 605B (LDR) data through to display 602 in response to signal 611 being absent, having an illegal or unexpected value (or a signal 611 indicating that a display 601A should receive LDR data).

In FIG. 9E, first mapper 608A is configured to interpolate between first video data 605A and second video data 605B in response to signal 611 indicating that display 601A should receive video data that is different in fidelity (e.g. gamut and.or dynamic range) from either first video data 605A and second video data 605B.

Figure 11:
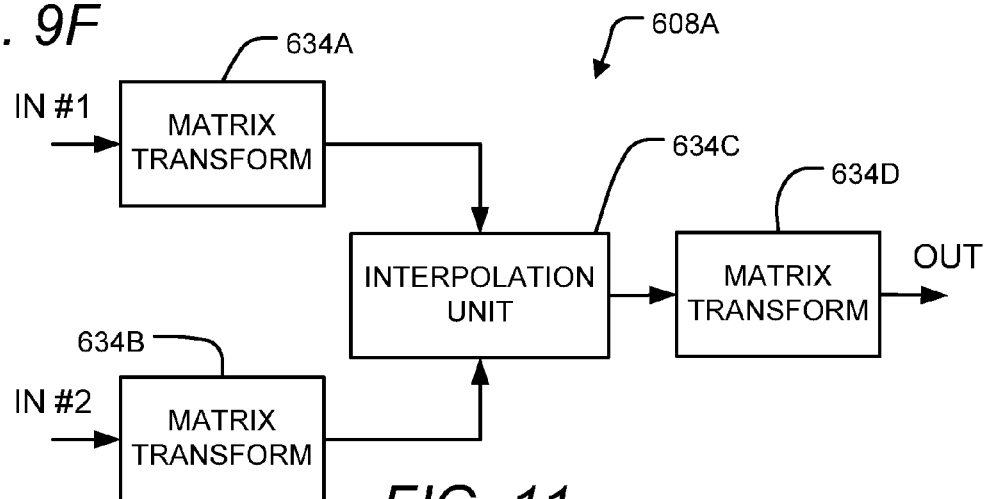
FIG. 11 is a block diagram illustrating one possible architecture for a mapper.

A mapper 608A may have any of a wide variety of constructions and may be implemented in software and/or hardware. In some embodiments, as illustrated by FIG. 11, mapper 608A comprises hardware and/or software that provides: a first matrix transformation 634A that transforms a video signal at a first input into a working color space; a second matrix transformation 634B that transforms a video signal at a second input into the working color space; an interpolation unit 634C that interpolates between pixel values received from matrix transformations 634A and 634B and outputs interpolated pixel values; and a third matrix transformation 634D that transforms from the working color space to a color space of the output signal. The working color space may, for example, comprise an XYZ color space although other color spaces may also be used. In some embodiments one or more mappers combine the features of mapper 608 and mapper 608A.

The above description and accompanying drawings illustrate a number of non-limiting example embodiments of the invention. Features of the example embodiments may be combined in ways other than those expressly set out herein to provide further example embodiments.

Certain implementations of the invention comprise computer processors which execute software instructions which cause the processors to perform a method of the invention. For example, one or more processors in an image processing device such as a display may implement the methods of FIGS. 4, 5 and 6 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or other non-transitory media. The computer-readable signals on the program product may optionally be compressed or encrypted.

Where a component (e.g. a software module, processor, display, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments of the invention.

As will be apparent to those skilled in the art in the light of the foregoing disclosure, many alterations and modifications are possible in the practice of this invention without departing from the spirit or scope thereof. For example:

The embodiments described herein may be applied to different kinds of image data, such as still image data or video data. The image data may be represented in different image data formats, such as, for example: RGB, YLU, GIF, TIFF, JPEG/JIF, PNG, BMP, PDF, RAW, FITS, MPEG, MP4, high dynamic range (HDR) formats such as BEF, HDRi, JPEG XR, JPEG HDR, RGBE, ScRGB and many others.

Accordingly, the invention may be embodied in any of the forms described herein, including, but not limited to the following Enumerated Example Embodiments (EEEs) which describe structure, features, and functionality of some portions of the present invention:

EEE1. A method of processing image data for a display, the method comprising:
    receiving first and second image data streams representing a series of corresponding images to be displayed;
    determining relative ranges of a first set of values specified in the first image data stream and a second set of corresponding values specified in the second image data stream;
    determining a weighted combination of the first and second sets of values based at least in part on a comparison of the display capabilities and the relative ranges; and
    applying the weighted combination to generate a third set of values for output to the display;
    wherein the first, second and third sets of values comprise one of:
        chrominance values; and
        luminance values.

EEE2. A method according to EEE 1, wherein the image data comprises video data.

EEE3. A method according to any one of EEEs 1 or 2, wherein the first image data stream is represented in a different image data format than the second image data stream.

EEE4. A method according to any one of EEEs 1 to 3, wherein the first set of values has a greater range than the second set of values.

EEE5. A method according to EEE 4, wherein the third set of values has a range which is intermediate the ranges of the first and second sets of values.

EEE6. A method of processing image data for a display, the method comprising:
    receiving first and second image data streams representing a series of corresponding images to be displayed; and
    interpolating between a first set of values specified in the first image data stream and a second set of values specified in the second image data stream to generate a third set of values for output to the display;
    wherein the first, second and third sets of values comprise one of:
        chrominance values; and
        luminance values.

EEE7. A method according to EEE 6, wherein the image data comprises video data.

EEE8. A method according to any one of EEEs 6 or 7, wherein the first image data stream is represented in a different image data format than the second image data stream.

EEE9. A method according to any one of EEEs 6 to 8, wherein the first set of values has a greater range than the second set of values.

EEE10. A method according to EEE 9, wherein the third set of values has a range which is intermediate the ranges of the first and second sets of values.

EEE11. An apparatus for processing video data for a display, the apparatus comprising:
    a video data receiver configured to receive first and second video data streams representing a series of corresponding images to be displayed;
    a parameter retriever configured to receive display parameters from a display; and
    an output signal generator configured to perform the steps of:
        determining relative ranges of a first set of values specified in the first video data stream and a second set of corresponding values specified in the second video data stream;
        determining a weighted combination of the first and second sets of values based at least in part on a comparison of the display parameters and the relative ranges; and
        applying the weighted combination to generate a third set of values for output to the display;
    wherein the first, second and third sets of values comprise one of:
        chrominance values; and
        luminance values.

EEE12. An apparatus according to EEE 11, wherein the signal generator is disabled if the display parameters indicate that the display range exceeds the ranges of the first and second sets of values.

EEE13. A method of processing image data for a display, comprising:
    receiving a stream of image data;
        receiving display information from the display;
        identifying a range of the display from the display information;
        identifying a range of the image data;
        comparing the range of the display to the range of the image data; and,
        if the range of the display is less than the range of the image data, mapping the range of the image data to the range of the display.

EEE14. A method according to EEE 13, wherein the range of the display and the range of the image data are the gamut of the display and of the image data respectively.

EEE15. A method according to EEE 13, wherein the range of the display and the range of the image data are the dynamic range of the display and of the image data respectively.

EEE16. A method according to any one of EEEs 14 or 15, wherein mapping the range of the image data to the range of the display comprises applying a predetermined function which maps each input value to a corresponding output value within the range of the display.

EEE17. A method according to any one of EEEs 14 or 15, wherein mapping the range of the image data to the range of the display comprises applying image characteristics to guide the mapping.

EEE18. A method according to EEE 17, comprising obtaining the image characteristics from content metadata extracted from the image data.

EEE19. A method for processing image data for a display, comprising:
    receiving first and second image data streams representing a series of corresponding images to be displayed, wherein a range of a first set of values specified in the first image data stream is greater than a range of a second set of corresponding values specified in the second image data stream;
    requesting display capability information from the display, and, if the display capability information is received:
        identifying a range of the display from the display capability information;
        comparing the range of the display to the range of the first set of values; and, if the range of the display is equal to or greater than the range of the first set of values, providing the first image data stream to the display;

whereas, if the range of the display is less than the range of the first set of values, performing one of:
determining a weighted combination of the first and second sets of values based at least in part on a comparison of the display capabilities and relative ranges of the first and second sets of values, and applying the weighted combination to generate a third set of values for output to the display; and providing the second image data stream to the display;

whereas, if no display capability information is received, providing the second image data stream to the display.

EEE20. A method according to EEE 19, wherein the first, second and third sets of values comprise one of:
chrominance values; and
luminance values.

EEE21. A method according to either one of EEEs 19 or 20, wherein the first image data stream is represented in a different image data format than the second image data stream.

EEE22. A method according to any one of EEEs 19 to 21, wherein the third set of values has a range which is intermediate the ranges of the first and second sets of values.

EEE23. An apparatus for processing image data for reproduction on a display, comprising:
inputs for receiving first and second image data streams representing a series of corresponding images to be displayed, wherein a range of a first set of values specified in the first image data stream is greater than a range of a second set of corresponding values specified in the second image data stream;
an image data stream negotiating unit configured to:
request display capability information from the display, and, if the display capability information is received:
identify a range of the display from the display capability information;
compare the range of the display to the range of the first set of values; and,
if the range of the display is equal to or greater than the range of the first set of values, output the first image data stream to the display;
whereas, if the range of the display is less than the range of the first set of values, the image data stream negotiating unit is configured to perform one of:
determining a weighted combination of the first and second sets of values based at least in part on a comparison of the display capabilities and relative ranges of the first and second sets of values, and applying the weighted combination to generate a third set of values for output to the display; and
outputting the second image data stream to the display;
whereas, if no display capability information is received, the image data stream negotiating unit is configured to provide the second image data stream to the display.

EEE24. A system for displaying image data, comprising:
a display operable in a self-mapping mode or a guided mapping mode, wherein if the display is in the self-mapping mode, the display communicates in display capability information a range which is greater than its actual display range, and if the display is in the guided mapping mode, the display communicates in display capability information a range which is equal to its actual display range;
an apparatus for processing image data for reproduction on the display, comprising:
inputs for receiving first and second image data streams representing a series of corresponding images to be displayed, wherein a range of a first set of values specified in the first image data stream is greater than a range of a second set of corresponding values specified in the second image data stream;
a processing unit configured to:
request display capability information from the display;
identify a range of the display from the display capability information;
compare the range of the display to the range of the first set of values; and,
if the range of the display is equal to or greater than the range of the first set of values, output the first image data stream to the display;
whereas, if the range of the display is less than the range of the first set of values, the processing unit is configured to perform one of:
determining a weighted combination of the first and second sets of values based at least in part on a comparison of the display capabilities and relative ranges of the first and second sets of values, and applying the weighted combination to generate a third set of values for output to the display; and
outputting the second image data stream to the display.

EEE25. A method for processing image data for a display, comprising:
receiving image data specifying a set of values;
requesting display capability information from the display; and,
based at least in part on a range of the display as specified in the display capability information, performing one of:
mapping the set of values specified in the image data to corresponding output values within the range of the display, and outputting the output values to the display; and
outputting the image data to the display.

EEE26. A method according to EEE 25, wherein the image data comprises a plurality of streams of image data, and outputting the image data to the display comprises:
selecting one of the streams of image data; and
outputting the selected stream of image data to the display.

EEE27. A method for controlling image data processing, comprising:
communicating a display range which is greater than an actual display range to an image data processing unit;
receiving image data from the image data processing unit; and
mapping a set of values specified in the image data to corresponding output values within the actual display range for reproduction on a display.

Accordingly, the scope of the invention is to be construed in accordance with the substance defined by the following claims.

The invention claimed is:

1. A method of processing image data for a display, the method comprising:
   receiving first and second image data streams representing a series of corresponding images to be displayed;
   determining relative ranges of a first set of values specified in the first image data stream and a second set of corresponding values specified in the second image data stream;
   determining a weighted combination of the first and second sets of values based at least in part on a comparison of the display capabilities and the relative ranges; and
   applying the weighted combination to generate a third set of values for output to the display;
   wherein the first, second and third sets of values comprise one of:
   chrominance values; and
   luminance values.

2. A method according to claim 1, wherein the image data comprises video data.

3. A method according to claim 1, wherein the first image data stream is represented in a different image data format than the second image data stream.

4. A method according to claim 1, wherein the first set of values has a greater range than the second set of values.

5. A method according to claim 4, wherein the third set of values has a range which is intermediate the ranges of the first and second sets of values.

6. A method of processing image data for a display, the method comprising:
   receiving first and second image data streams representing a series of corresponding images to be displayed;
   making a comparison of at least one capability of the display, a range of a first set of values specified in the first image data stream, and a range of a second set of values specified in the second image data stream; and
   interpolating between the first set of values specified in the first image data stream and the second set of values specified in the second image data stream based on said comparison to generate a third set of values for output to the display; and
   wherein the first, second and third sets of values comprise one of:
   chrominance values; and
   luminance values.

7. A method according to claim 6, wherein the image data comprises video data.

8. A method according to claim 6, wherein the first image data stream is represented in a different image data format than the second image data stream.

9. A method according to claim 6, wherein the range of the first set of values is greater than the range of the second set of values.

10. A method according to claim 9, wherein the third set of values has a range which is intermediate the ranges of the first and second sets of values.

11. An apparatus for processing video data for a display, the apparatus comprising:
    a video data receiver configured to receive first and second video data streams representing a series of corresponding images to be displayed;
    a parameter retriever configured to receive display parameters from a display; and
    an output signal generator configured to perform the steps of:
    determining relative ranges of a first set of values specified in the first video data stream and a second set of corresponding values specified in the second video data stream;
    determining a weighted combination of the first and second sets of values based at least in part on a comparison of the display parameters and the relative ranges; and
    applying the weighted combination to generate a third set of values for output to the display;
    wherein the first, second and third sets of values comprise one of:
    chrominance values; and
    luminance values.

12. An apparatus according to claim 11, wherein the signal generator is disabled if the display parameters indicate that the display range exceeds the ranges of the first and second sets of values.

13. The apparatus according to claim 11, wherein the apparatus comprises a projector based on narrow-band light sources.

14. The apparatus according to claim 13, wherein the projector comprises a laser projector.

15. The apparatus according to claim 11, wherein the apparatus is a digital mirror device (DMD) projection device.

16. The apparatus according to claim 15, wherein the projector comprises laser light sources.

17. A method of processing image data for a display, comprising:
    receiving a first stream of image data;
    receiving a second stream of image data;
    receiving display information from the display;
    identifying a range of the display from the display information;
    identifying a range of the first stream of image data;
    identifying a range of the second stream of image data;
    comparing the range of the display to the range of the first stream of image data and to the range of the second stream of image data; and,
    depending on the comparison of the range of the display to the ranges of the first stream of image data and the second stream of image data, mapping the range of at least one of the first stream of image data and the second stream of image data to the range of the display.

18. A method according to claim 17, wherein the range of the display, the range of the first stream of image data, and the range of the second stream of image data are the gamuts of the display, of the first stream of image data, and of the second stream of image data respectively.

19. A method according to claim 17, wherein the range of the display, the range of the first stream of image data, and the range of the second stream of image data are the dynamic ranges of the display, of the first stream of image data, and of the second stream of image data respectively.

20. A method according to claim 18, wherein the step of mapping comprises applying a predetermined function which maps each input value of at least one of said first stream of image data and said second stream of image data to a corresponding output value within the range of the display.

* * * * *